US012360489B2

(12) United States Patent
Nakajima

(10) Patent No.: US 12,360,489 B2
(45) Date of Patent: Jul. 15, 2025

(54) IMAGE FORMING APPARATUS

(71) Applicant: CANON KABUSHIKI KAISHA, Tokyo (JP)

(72) Inventor: Keita Nakajima, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/643,058

(22) Filed: Apr. 23, 2024

(65) Prior Publication Data

US 2024/0369963 A1 Nov. 7, 2024

(30) Foreign Application Priority Data

May 1, 2023 (JP) ................................ 2023-075873

(51) Int. Cl.

*G03G 15/16* (2006.01)
*G03G 15/00* (2006.01)
*G03G 15/20* (2006.01)
*G03G 21/16* (2006.01)

(52) U.S. Cl.

CPC ......... *G03G 21/1633* (2013.01); *G03G 15/20* (2013.01); *G03G 15/6579* (2013.01); *G03G 15/757* (2013.01)

(58) Field of Classification Search

CPC .. G03G 15/20; G03G 15/6579; G03G 15/757; G03G 21/1633; G65H 29/58; G65H 29/60

See application file for complete search history.

(56) References Cited

U.S. PATENT DOCUMENTS 9,260,273 B2 * 2/2016 Mizuno .................. B65H 29/58
2014/0035219 A1 * 2/2014 Yamamoto ............... B65H 5/36 271/225
2021/0024317 A1 * 1/2021 Tanaka ................... B65H 29/58
2022/0169470 A1 6/2022 Asano et al.

FOREIGN PATENT DOCUMENTS

JP 2002145504 A 5/2002
JP 2012153521 A 8/2012
JP 2022021799 A 2/2022
JP 2022085562 A 6/2022

* cited by examiner

*Primary Examiner* — Hoang X Ngo

(74) *Attorney, Agent, or Firm* — ROSSI, KIMMS & McDOWELL LLP

(57) ABSTRACT

An image forming apparatus includes an apparatus body, an opening and closing member configured to move between a closed position and an open position. The apparatus body includes an image forming portion, a sheet conveyance path including a first conveyance path and a second conveyance path, a guide member configured to move to a first guide position and a second guide position, a drive source, and a guide moving member including a pressing portion. The guide member is configured to move to a first retraction position to open the sheet conveyance path. The pressing portion is disposed at a position not overlapping a movement locus of the pressed portion in a case where the guide member moves between the first guide position, the second guide position, and the first retraction position.

20 Claims, 18 Drawing Sheets

IMAGE FORMING APPARATUS

BACKGROUND OF THE INVENTION

Field of the Invention

The present invention relates to an image forming apparatus that forms an image on a sheet.

Description of the Related Art

JP 2012-153521 A proposes an image forming apparatus including a main conveyance path for conveying a sheet on which an image is formed toward a sheet discharge tray, a reverse conveyance path branched from the main conveyance path, and a switching member. The switching member is configured to be switchable among a main conveyance posture in which the sheet is guided to the main conveyance path, a switching posture in which the sheet is guided to the reverse conveyance path, and a separated posture in which the switching member is separated from the main conveyance path.

A reciprocating piece of a solenoid is connected to the switching member, and when the solenoid is energized, the switching member is switched from the main conveyance posture to the switching posture. The switching member can transition to the separated posture by opening a right cover member provided in the image forming apparatus.

However, the reciprocating piece of the solenoid is always connected to the switching member described in JP 2012-153521 A. For example, when the switching member transitions to the separated posture by a user operation, the reciprocating piece of the solenoid connected to the switching member also moves. For this reason, a force required for operating the switching member increases, and operability of the switching member deteriorates.

SUMMARY OF THE INVENTION

According to one aspect of the present invention, an image forming apparatus includes an apparatus body, an opening and closing member configured to move between a closed position at which the opening and closing member is closed with respect to the apparatus body and an open position at which the opening and closing member is opened with respect to the apparatus body. The apparatus body includes an image forming portion configured to form an image on a sheet, a sheet conveyance path including a first conveyance path and a second conveyance path through which the sheet passes, a guide member configured to move to a first guide position at which the guide member guides the sheet toward the first conveyance path, and a second guide position at which the guide member guides the sheet toward the second conveyance path in a state where the opening and closing member is positioned at the closed position, a drive source, and a guide moving member including a pressing portion and configured to be positioned at a first position in a case where the opening and closing member is positioned at the open position, the guide moving member moving the guide member from the first guide position to the second guide position by the pressing portion pressing a pressed portion of the guide member in a case where the guide moving member moves from the first position to a second position by receiving a driving force from the drive source. The guide member is configured to move to a first retraction position to open the sheet conveyance path in a state where the opening and closing member is positioned at the open position and the guide moving member is positioned at the first position. The pressing portion of the guide moving member positioned at the first position is disposed at a position not overlapping a movement locus of the pressed portion in a case where the guide member moves between the first guide position, the second guide position, and the first retraction position.

Further features of the present invention will become apparent from the following description of exemplary embodiments with reference to the attached drawings.

DESCRIPTION OF THE EMBODIMENTS

First Embodiment

Overall Configuration

Hereinafter, an embodiment in a case of being applied to an electrophotographic laser printer will be specifically described as an example of a configuration of an image forming apparatus according to the present invention.

Figure 1:
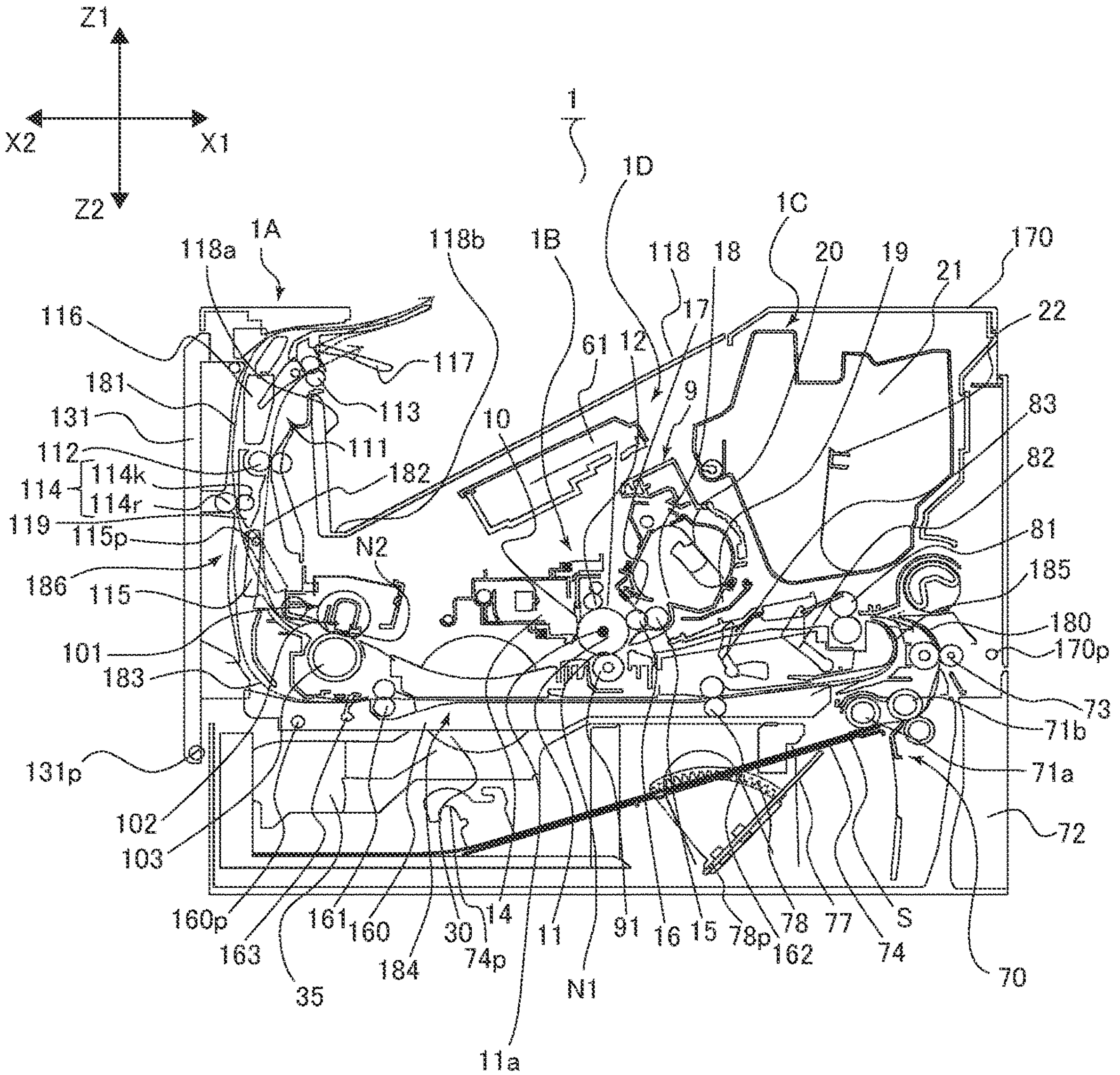
FIG. 1 is a cross-sectional view illustrating an image forming apparatus according to a first embodiment.

FIG. 1 is a cross-sectional view illustrating a configuration of an image forming apparatus according to a first embodiment. However, the dimensions, materials, shapes, relative arrangements, and the like of components described in the present embodiment are not intended to limit the scope of the present invention unless otherwise specified.

The image forming apparatus includes a printer, a copier, a facsimile, and a multifunction peripheral, and refers to an apparatus that forms an image on a sheet used as a recording medium based on image information input from an external personal computer (PC) or image information read from a document. In addition to a body having an image forming function, the image forming apparatus may be connected to accessory equipment such as an option feeder, an image reading device, or a sheet processing device, and the entire system to which such accessory equipment is connected is also a type of the image forming apparatus.

As illustrated in FIG. 1, the image forming apparatus 1 includes an apparatus body 1A, a process cartridge 1B, and a toner cartridge 1C. In addition, the process cartridge 1B and the toner cartridge 1C are attachable to and detachable from the apparatus body 1A.

The process cartridge 1B includes a cleaning unit 8 including a photosensitive drum 11 serving as a photosensitive member, and a developing unit 9 including a developing roller 16 that bears a developer containing toner. The cleaning unit 8 includes the photosensitive drum 11, a cleaning blade 10, a charging roller 12, and a waste toner storage portion 14. The photosensitive drum 11 is rotatably supported about a rotation shaft 11*a* extending in a Y direction, and bears a toner image. The charging roller 12 is disposed so as to be in contact with an outer peripheral surface of the photosensitive drum 11, and charges the photosensitive drum 11 as a voltage is applied from the apparatus body 1A. Further, the charging roller 12 rotates following the photosensitive drum 11.

The cleaning blade 10 is an elastic member disposed so as to be in contact with the outer peripheral surface of the photosensitive drum 11. A distal end of the cleaning blade 10 is in elastic contact with the photosensitive drum 11 to remove toner remaining on the photosensitive drum 11 after the toner image is transferred to a sheet S described below. Waste toner, which is the removed toner, is conveyed to the toner cartridge 1C through a waste toner conveyance path (not illustrated) via the waste toner storage portion 14, and is stored in a waste toner collection portion (not illustrated).

The developing unit 9 includes the developing roller 16, a supply roller 15, a developing blade 17, a developing chamber 18, a toner storage chamber 19, and a stirring member 20. The developing roller 16 supplies toner to a developing region of the photosensitive drum 11. Then, the developing roller 16 develops an electrostatic latent image formed on the photosensitive drum 11 as the toner image by using the toner. The supply roller 15 supplies the toner to the developing roller 16. The developing blade 17 abuts on a peripheral surface of the developing roller 16 to define the amount of the toner to adhere to the peripheral surface of the developing roller 16. The developing blade 17 applies triboelectric charge to the toner.

The toner stored in the toner storage chamber 19 is sent to the developing chamber 18 by rotation of the stirring member 20 and supplied to the developing roller 16. A remaining amount of the toner in the toner storage chamber 19 is detected by a remaining amount detection portion (not illustrated). When the amount of the toner in the toner storage chamber 19 becomes equal to or less than a certain amount, the toner is supplied from the toner cartridge 1C to the process cartridge 1B by a supply portion (not illustrated).

The toner cartridge 1C includes a toner storage portion 21 and a stirring and conveying unit 22. When the toner is supplied from the toner cartridge 1C to the toner storage chamber 19 of the process cartridge 1B, the stirring and conveying unit 22 conveys the toner stored in the toner storage portion 21 toward the supply portion (not illustrated).

The apparatus body 1A includes a sheet feeding portion 70, a transfer roller 91, a laser scanner 61, a fixing portion 101, a discharge reversing unit 111, a duplex conveyance unit 184, and the like. The laser scanner 61, the transfer roller 91, and the process cartridge 1B form an image forming portion 1D that forms an image on the sheet S. The sheet feeding portion 70 includes a cassette 72 detachably supported by the apparatus body 1A, a pickup roller 71*a*, and a separation roller pair 71*b*. In the present embodiment, the cassette 72 can be pulled out from the apparatus body 1A toward a front side of the image forming apparatus 1, that is, in an X1 direction, and can be mounted in an X2 direction.

The sheet S includes paper such as a sheet or an envelope, a plastic film such as a sheet for an overhead projector (OHP), cloth, and the like.

The cassette 72 includes a middle plate 74 that supports the sheet S and is provided so as to be movable up and down about a pivot shaft 74*p*, and a lifting arm 77 that is provided so as to be pivotable about a pivot shaft 78*p*. When a lifting gear 78 rotates, the lifting arm 77 pivots about the pivot shaft 78*p*. When the lifting arm 77 pivots upward about the pivot shaft 78*p*, the lifting arm 77 lifts the middle plate 74 upward about the pivot shaft 74*p*.

The transfer roller 91 serving as a transfer portion forms a transfer nip N1 together with the photosensitive drum 11. The fixing portion 101 includes a heating roller 102 incorporating a heater, and a pressure roller 103 that is in pressure contact with the heating roller 102 and forms a fixing nip N2 together with the heating roller 102.

The image forming apparatus 1 includes a sheet conveyance path 186 on which the sheet Sis conveyed. In the present embodiment, the sheet conveyance path 186 is disposed downstream of the fixing portion 101 in a conveyance direction of the sheet S. The sheet conveyance path 186 includes a discharge conveyance path 182 and a reverse conveyance path 181. The discharge reversing unit 111 includes a guide member 115, an intermediate conveyance roller pair 112, a sheet discharge roller pair 113, a full load detection flag 117, a reverse conveyance roller pair 114, an intermediate conveyance guide 116, and the like. The discharge reversing unit 111 includes the discharge conveyance path 182 and the reverse conveyance path 181. The guide member 115 is pivotably supported about a pivot center boss 115*p*, and is configured to be pivotable between a discharge position serving as a first guide position indicated by a solid line in FIG. 1 and a reversing position serving as a second guide position indicated by a broken line in FIG. 1. When the guide member 115 is positioned at the discharge position, the guide member 115 serving as a guide member guides the sheet S sent from the fixing portion 101 toward the discharge conveyance path 182. Further, when the guide member 115 is positioned at the reversing position, the guide member 115 guides the sheet S sent from the fixing portion 101 toward the reverse conveyance path 181.

The intermediate conveyance roller pair 112 is disposed between the fixing portion 101 and the sheet discharge roller pair 113, and conveys the sheet S passing through the discharge conveyance path 182 toward the sheet discharge roller pair 113. The reverse conveyance roller pair 114 serving as a reverse conveyance portion is disposed above the guide member 115. The reverse conveyance roller pair 114 once conveys the sheet S conveyed to the reverse conveyance path 181 upward and then conveys the sheet S downward. That is, the reverse conveyance roller pair 114 switches back the sheet S and conveys the sheet S toward the duplex conveyance unit 184.

The image forming apparatus 1 includes a duplex conveyance path 183 serving as a third conveyance path through which the sheet S conveyed from the reverse conveyance path 181 passes. The duplex conveyance path 183 can also be referred to as a part of the sheet conveyance path 186. The duplex conveyance unit 184 includes a duplex conveyance guide 160, a duplex sensor 163, and conveyance roller pairs 161 and 162. The duplex conveyance guide 160 forms at least a part of the duplex conveyance path 183 and guides the sheet S. The duplex sensor 163 detects a position of a leading edge of the sheet S passing through the duplex conveyance path 183. The conveyance roller pairs 161 and 162 convey the sheet S passing through the duplex conveyance path 183. A U-shaped portion 185 curved in a U shape is provided at a downstream end portion of the duplex conveyance path 183 in the sheet conveyance direction, and the sheet S is conveyed to a registration roller pair 81 via the U-shaped portion 185.

When an image forming command is output to the image forming apparatus 1, an image forming process in the image forming portion 1D is started based on image information input from an external computer or the like connected to the image forming apparatus 1. The laser scanner 61 irradiates the photosensitive drum 11 with laser light based on the input image information. At this time, the photosensitive drum 11 is charged in advance by the charging roller 12, and an electrostatic latent image is formed on the photosensitive drum 11 irradiated with the laser light. Thereafter, the electrostatic latent image is developed by the developing roller 16, and a monochrome toner image is formed on the photosensitive drum 11.

In parallel with the above-described image forming process, the sheet S is fed from the sheet feeding portion 70. When the sheet S is fed from the sheet feeding portion 70, the lifting arm 77 is driven, so that the middle plate 74 pivots upward about the pivot shaft 74*p*. Thus, the sheet S placed on the middle plate 74 abuts on the pickup roller 71*a*. In this state, the pickup roller 71*a* and the separation roller pair 71*b* are driven, and the sheet S is fed by the pickup roller 71*a*. Further, the sheets S fed by the pickup roller 71*a* are separated and conveyed one by one by the separation roller pair 71*b*.

The sheet S separated one by one by the separation roller pair 71*b* is conveyed to the registration roller pair 81 through a feeding conveyance path 180 by a conveyance roller pair 73, and skew feeding is corrected by the registration roller pair 81. A paper width sensor 82 and a registration sensor 83 are disposed downstream of the registration roller pair 81 in the sheet conveyance direction. The paper width sensor 82 detects a size of the sheet in a width direction, the sheet being conveyed at a predetermined conveyance timing by the registration roller pair 81, and the registration sensor 83 detects the position of the leading edge of the sheet S. The width direction is a direction orthogonal to the sheet conveyance direction and a thickness direction of the sheet S.

The fixing portion 101 controls the heater incorporated in the heating roller 102 according to the size of the sheet S in the width direction detected by the paper width sensor 82. The image forming portion 1D determines a timing at which the toner image is to be formed based on the position of the leading edge of the sheet S detected by the registration sensor 83.

Then, when an electrostatic load bias is applied to the transfer roller 91, the toner image on the photosensitive drum 11 is transferred to the sheet S at the transfer nip N1. The remaining toner on the photosensitive drum 11 is collected in the waste toner storage portion 14 by the cleaning blade 10. Predetermined heat and pressure are applied to the sheet S to which the toner image has been transferred at the fixing nip N2 by the heating roller 102 and the pressure roller 103 of the fixing portion 101, and the toner is melted and fixed.

In a case where the toner image is formed on only one surface of the sheet S, the sheet S having passed through the fixing portion 101 is guided to the discharge conveyance path 182 serving as a first conveyance path by the guide member 115 positioned at the discharge position. Then, the sheet S is conveyed to the sheet discharge roller pair 113 by the intermediate conveyance roller pair 112 via the discharge conveyance path 182. The sheet discharge roller pair 113 serving as a discharge portion discharges the sheet S to the outside of the apparatus, and the sheet S is stacked on a sheet discharge tray 118 formed in an upper surface of the image forming apparatus 1.

When the sheet discharge roller pair 113 discharges the sheet S to the outside of the apparatus, the full load detection flag 117 is swung up from a standby position indicated by a solid line in FIG. 1 toward a position indicated by a broken line by being pressed by the sheet S. When a height of the sheets S stacked on the sheet discharge tray 118 reaches a predetermined height, the full load detection flag 117 positioned at the standby position abuts on the sheet S stacked on the sheet discharge tray 118. Then, when the sheet S is further discharged to the sheet discharge tray 118 and the full load detection flag 117 pivots by a predetermined angle or more from the standby position, it is determined that the sheet discharge tray 118 is in a full-load state, and the conveyance of the sheet S by the image forming apparatus 1 is stopped.

In the present embodiment, the sheet discharge tray 118 is inclined downward in a vertical direction (Z direction) as it goes upstream in a discharge direction of the sheet S aligned with the X1 direction. As a result, the sheet S discharged to the sheet discharge tray 118 slides down along the sheet discharge tray 118 and abuts on a regulating surface 118*a*. Accordingly, the sheet S is aligned in the discharge direction.

In the present embodiment, a lowermost portion 118*b* of the sheet discharge tray 118 in the vertical direction, which is continuous with the regulating surface 118*a*, is positioned at a position lower than the intermediate conveyance roller pair 112. As described above, the sheet discharge tray 118 is formed to be relatively deep, so that a large amount of sheets S can be stacked. When the sheet discharge tray 118 is formed deep, the discharge conveyance path 182 between the fixing portion 101 and the sheet discharge roller pair 113 becomes long. However, in the present embodiment, since the intermediate conveyance roller pair 112 is disposed between the fixing portion 101 and the sheet discharge roller pair 113, even a minimum-sized sheet that can be conveyed by the image forming apparatus 1 can be reliably conveyed on the discharge conveyance path 182.

In a case of forming toner images on both surfaces of the sheet S, the guide member 115 is positioned at the reversing position in advance. Then, an image is formed on a first surface, and the sheet S having passed through the fixing portion 101 is guided to the reverse conveyance path 181 serving as a second conveyance path by the guide member 115 positioned at the reversing position. The reverse conveyance path 181 is provided with the reverse conveyance roller pair 114 including a reverse driving roller 114*r* implemented by a rubber roller and a reverse driven roller 114*k* that rotates following the reverse driving roller 114*r*. A rotation direction of the reverse conveyance roller pair 114 is switched by a rotation direction switching portion (not illustrated) at a timing when a trailing edge of the sheet S reaches a predetermined position. The guide member 115 moves from the reversing position to the discharge position.

As a result, the sheet S is switched back in the reverse conveyance path 181, and is guided to the duplex conveyance path 183 of the duplex conveyance unit 184 by the guide member 115 positioned at the discharge position. The position of the leading edge of the sheet S conveyed to the duplex conveyance path 183 is detected by the duplex sensor 163. The image forming apparatus 1 grasps a timing at which the sheet S enters the conveyance roller pair 161 based on a detection result of the duplex sensor 163.

The conveyance roller pair 161 is in a stopped state, and the sheet S abuts against a nip of the conveyance roller pair 161 in the stopped state, so that skew feeding is corrected. Then, the conveyance roller pair 161 is driven after a predetermined time from when the duplex sensor 163 detects the position of the leading edge of the sheet S. The sheet S is conveyed to the registration roller pair 81 via the U-shaped portion 185 by the conveyance roller pairs 161 and 162. The toner image is transferred to a second surface of the sheet S at the transfer nip N1, and the toner image is fixed to the sheet S by the fixing portion 101. Then, the sheet S is discharged to the sheet discharge tray 118 by the sheet discharge roller pair 113 via the discharge conveyance path 182.

Arrangement of Components of Apparatus Body

Next, a characteristic arrangement of components of the apparatus body 1A will be described with reference to FIG. 1. As illustrated in FIGS. 1 and 5A to 5C, directions (X1, X2, Y1, Y2, Z1, and Z2) are defined as follows.

An upward-downward direction is indicated by a Z axis. Arrow Z1 indicates an upward direction, and Arrow Z2 indicates a downward direction. A surface provided at an end of the image forming apparatus 1 in the Z1 direction is referred to as a top surface (upper surface), and a surface provided at an end of the image forming apparatus 1 in the Z2 direction is referred to as a bottom surface (bottom portion, lower portion, or lower end). The top surface of the image forming apparatus 1 faces upward (Z1 direction), and the bottom surface faces downward (Z2 direction). The Z1 direction and the Z2 direction may be collectively referred to as the upward-downward direction, a height direction, the vertical direction, a gravity direction, the Z direction, or a Z-axis direction.

A front-rear direction is indicated by an X axis. A direction toward an upstream side in a mounting direction when the cassette 72 is mounted on the apparatus body 1A of the image forming apparatus 1 is defined as the X1 direction, and a direction toward a downstream side in the mounting direction is defined as the X2 direction. For convenience, the X1 direction is referred to as the front, and the X2 direction is referred to as the rear. That is, a surface provided at an end of the image forming apparatus 1 in the X1 direction is referred to as a front surface (front portion or front end) of the image forming apparatus 1, and a surface provided at an end of the image forming apparatus 1 in the X2 direction is referred to as a rear surface (back surface, rear end, or rear portion).

The front surface of the image forming apparatus 1 faces the front (X1 direction), and the rear surface faces the rear (X2 direction). The X1 direction and the X2 direction may be collectively referred to as the front-rear direction, an X direction, or an X-axis direction.

Figure 3:
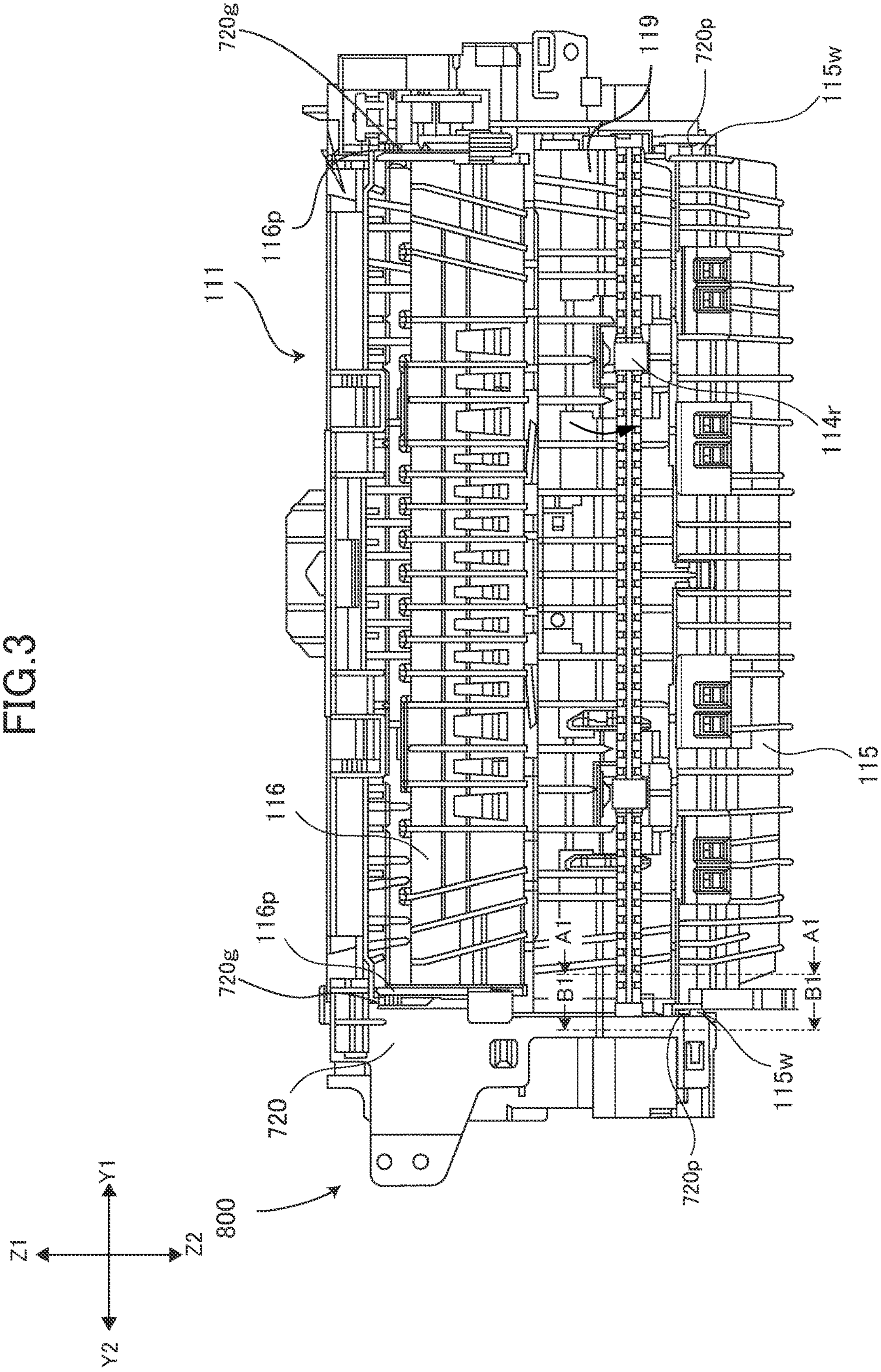
FIG. 3 is a front view illustrating a discharge reversing unit.

Further, as illustrated in FIG. 3, a left-right direction of the image forming apparatus 1 is indicated by a Y axis. For convenience, Arrow Y1 indicates a left direction when the cassette 72 is viewed in the mounting direction (that is, the X2 direction) at the time of mounting to the apparatus body 1A, and Arrow Y2 indicates a right direction. A surface provided at an end of the image forming apparatus 1 in the Y1 direction is referred to as a left side surface (left surface, left end, or left portion), and a surface provided at an end of the image forming apparatus 1 in the Y2 direction is referred to as a right side surface (right surface, right portion, or right end). The Y1 direction and the Y2 direction may be collectively referred to as the left-right direction, a lateral direction, the width direction, a Y direction, a Y-axis direction, or the like.

The X axis, the Y axis, and the Z axis are perpendicular to each other. For example, the X axis is perpendicular to the Y axis and is also perpendicular to the Z axis. In addition, a plane perpendicular to the X axis may be referred to as a YZ plane, a plane perpendicular to the Y axis may be referred to as a ZX plane, and a plane perpendicular to the Z axis may be referred to as an XY plane. For example, the XY plane is a horizontal plane. The X direction and the Y direction are directions along the XY plane which is a horizontal plane, that is, horizontal directions.

As illustrated in FIG. 1, the reverse conveyance roller pair 114 is disposed below the intermediate conveyance roller pair 112 in the Z direction. The reverse conveyance roller pair 114 is disposed below in order to shorten the duplex conveyance path 183 and improve productivity in duplex printing. The reverse conveyance roller pair 114 and the intermediate conveyance roller pair 112 are disposed so as to at least partially overlap each other in the X direction. As a result, the image forming apparatus 1 can be downsized in the X direction.

The conveyance roller pairs 161 and 162 are disposed at positions where a relatively long sheet such as an A4-sized sheet or an LTR-sized sheet can be stably conveyed to the U-shaped portion 185 having a small curvature and a large conveying resistance. The A4-sized sheet has a length of 297 mm in a longitudinal direction and the LTR-sized sheet has a length of 279.4 mm in the longitudinal direction.

The conveyance roller pair 161 is disposed at a position separated from the reverse conveyance roller pair 114 by a distance of 210 mm or less along the duplex conveyance path 183. Similarly, the conveyance roller pair 162 is disposed at a position separated from the conveyance roller pair 161 by a distance of 210 mm or less along the duplex conveyance path 183. A vertical A5-sized sheet, which is the minimum-sized sheet that can be conveyed in the duplex conveyance path 183, has a length of 210 mm in the longitudinal direction. Since the conveyance roller pairs 161 and 162 are disposed as described above, the conveyance roller pairs 161 and 162 can stably convey the minimum-sized sheet conveyed by the reverse conveyance roller pair 114 to the duplex conveyance path 183.

The conveyance roller pair 161 is disposed as close as possible to the fixing portion 101, and the degree of freedom in arrangement of the reverse conveyance roller pair 114 in the Z1 direction is improved. For example, in a product having a small capacity for sheets that can be stacked on the sheet discharge tray 118, the sheet discharge roller pair 113 and the reverse conveyance roller pair 114 may be integrated as one roller pair. In this case, it is possible to implement a configuration in which it is not necessary to additionally provide an intermediate conveyance roller pair between the reverse conveyance roller pair 114 (one roller pair) and the conveyance roller pair 161 in the reverse conveyance path 181.

The conveyance roller pairs 161 and 162 are disposed so as to at least partially overlap the transfer roller 91 in the Z direction. As a result, the image forming apparatus 1 can be downsized in the Z direction.

At least a part of the lifting gear 78 is disposed downstream of the conveyance roller pair 162 in the X1 direction. This is due to the following reasons. First, the conveyance roller pair 162 is disposed so as to avoid the transfer roller

91, the paper width sensor 82, and the registration sensor 83. Further, the conveyance roller pair 162 is disposed at a position separated from the conveyance roller pair 161 by a distance of 210 mm or less along the duplex conveyance path 183. As a result, the conveyance roller pair 162 can stably convey the minimum-sized sheet conveyed to the duplex conveyance path 183.

Next, the lifting gear 78 is disposed such that the pivot shaft 78*p* of the lifting gear 78 is as close as possible to the pivot shaft 74*p* of the middle plate 74 in the X direction. This is to prevent a relationship between a pivoting amount of the lifting gear 78 and an upward and downward movement amount of the middle plate 74 from changing as much as possible according to the amount of the sheet S stored in the cassette 72. As a result, the sheet S can be stably fed by the sheet feeding portion 70. For the above reason, the lifting gear 78 and the conveyance roller pair 162 have the above-described arrangement relationship.

A motor 30 serving as a drive source is disposed between the transfer roller 91 and the fixing portion 101 when viewed in the X direction. The motor 30 drives the photosensitive drum 11. For example, a DC motor such as a brushed DC motor is applied as the motor 30, but the motor 30 is not limited thereto. For example, a servo motor or a stepping motor may be used as the motor 30. The apparatus body 1A includes a fan 35 that cools the motor 30 by blowing air to the motor 30. The fan 35 is disposed below the fixing portion 101 and the duplex conveyance path 183 in the vertical direction (Z direction).

Configuration for Jam Handling

Figure 2:
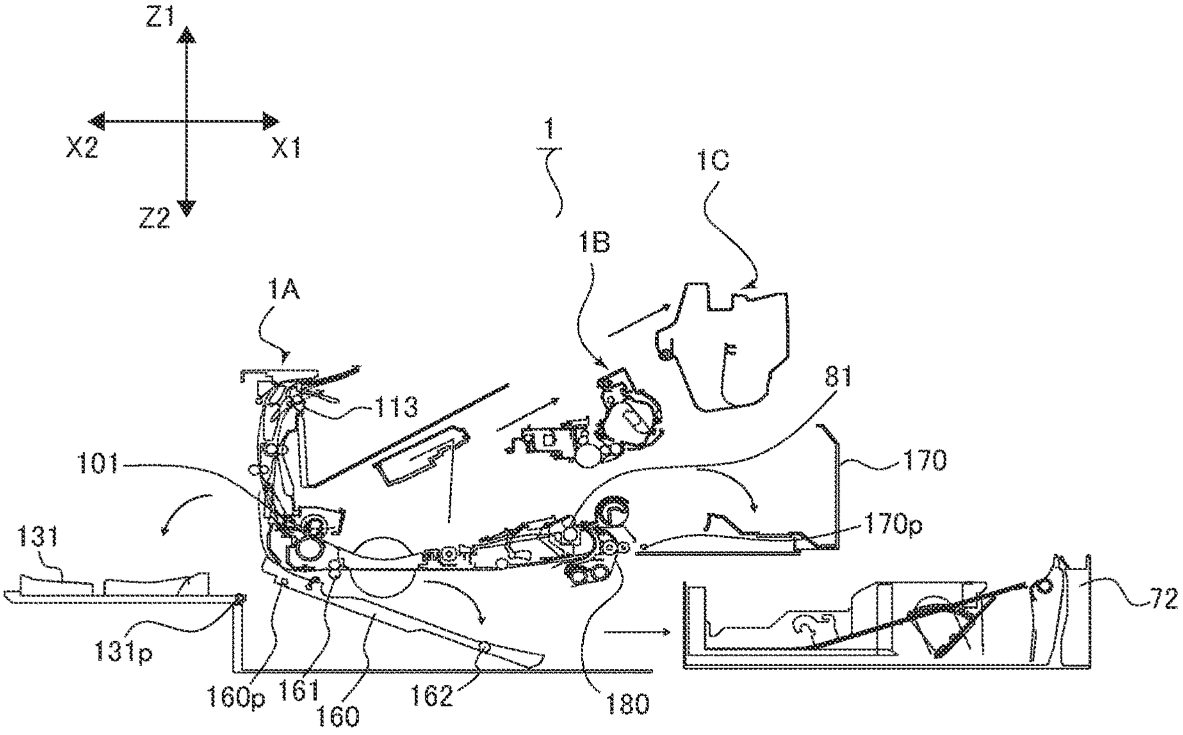
FIG. 2 is a cross-sectional view illustrating the image forming apparatus in a state where a front door, a rear door, and a duplex conveyance guide are opened.

Next, a configuration for jam handling when the sheet S is jammed in the apparatus body 1A of the image forming apparatus 1 will be described with reference to FIGS. 1 and 2. As illustrated in FIGS. 1 and 2, the image forming apparatus 1 includes a front door 170 and a rear door 131 provided so as to be openable and closable with respect to the apparatus body 1A. The front door 170 is provided on the front surface of the image forming apparatus 1 and is pivotable about a pivot center 170*p*. The rear door 131 serving as an opening and closing member is provided on the rear surface of the image forming apparatus 1, and is pivotable about a pivot shaft 131*p* extending in the Y direction (see FIG. 3). The duplex conveyance guide 160 is pivotable about a pivot center 160*p*, and can open the duplex conveyance path 183.

In a case where a jam occurs in a state where the leading edge of the sheet S is in the feeding conveyance path 180, the user pulls out the cassette 72 from the apparatus body 1A in the X1 direction. As a result, the user can access the feeding conveyance path 180 and can perform jam handling.

In a case where a jam occurs in a state where the leading edge of the sheet S is between the feeding conveyance path 180 and the fixing portion 101, the user opens the front door 170. Then, the user removes the toner cartridge 1C and the process cartridge 1B from the apparatus body 1A. As a result, the user can access the jammed sheet S and perform jam handling.

In a case where a jam occurs in a state where the leading edge of the sheet S is between the fixing portion 101 and the sheet discharge roller pair 113, or in a case where a jam occurs in a state where the leading edge of the sheet S that has been switched back is between the fixing portion 101 and the conveyance roller pair 161, the user opens the rear door 131. As a result, the user can access the jammed sheet S and perform jam handling.

In a case where a jam occurs in a state where the leading edge of the sheet S is between the conveyance roller pair 161 and the registration roller pair 81, the user pulls out the cassette 72 from the apparatus body 1A in the X1 direction. Further, the user opens the duplex conveyance guide 160 downward about the pivot center 160*p* to open the duplex conveyance path 183. As a result, the user can access the sheet S jammed in the duplex conveyance path 183, and can perform jam handling. When the duplex conveyance path 183 is opened downward, a nip of the conveyance roller pair 162 is separated, but the nip of the conveyance roller pair 161 is not separated. With such a configuration, the user who has accessed the duplex conveyance path 183 downstream of the duplex conveyance path 183 in the X1 direction can easily find the sheet S jammed in the duplex conveyance path 183, and jam handling performance can be improved.

Configuration of Switching Mechanism

Next, a configuration of a switching mechanism 800 for switching the position of the guide member 115 between the discharge position and the reversing position will be described with reference to FIGS. 3 to 4B. FIG. 3 is a front view illustrating the discharge reversing unit 111.

As illustrated in FIG. 3, the discharge reversing unit 111 includes a discharge frame (discharge unit) 720 fixed to an apparatus frame (not illustrated) of the apparatus body 1A, and the discharge frame 720 pivotably supports the guide member 115. The discharge frame 720 holds the reverse driving roller 114*r* of the reverse conveyance roller pair 114. The discharge frame 720 has a function of guiding the sheet S conveyed through the discharge conveyance path 182 and the reverse conveyance path 181.

The discharge frame 720 has two pivot center holes 720*p* (see FIG. 3) and two pivot center bosses 720*g*. Pivot center bosses 115*w* are provided at both end portions of the guide member 115 in the Y direction. The pivot center boss 115*w* of the guide member 115 is inserted into the pivot center hole 720*p*. Accordingly, the guide member 115 is pivotably supported with respect to the discharge frame 720 about the pivot center boss 115*p* and the pivot center hole 720*p*.

The pivot center boss 720*g* is inserted into a pivot center hole 116*p* of the intermediate conveyance guide 116. As a result, the intermediate conveyance guide 116 is pivotably supported with respect to the discharge frame 720 around the pivot center boss 720*g* and the pivot center hole 116*p*. The switching mechanism 800 is provided upstream of the discharge frame 720 in the Y1 direction. The discharge frame 720 includes a relay guide 119 between the intermediate conveyance guide 116 and the guide member 115.

Figure 4A:
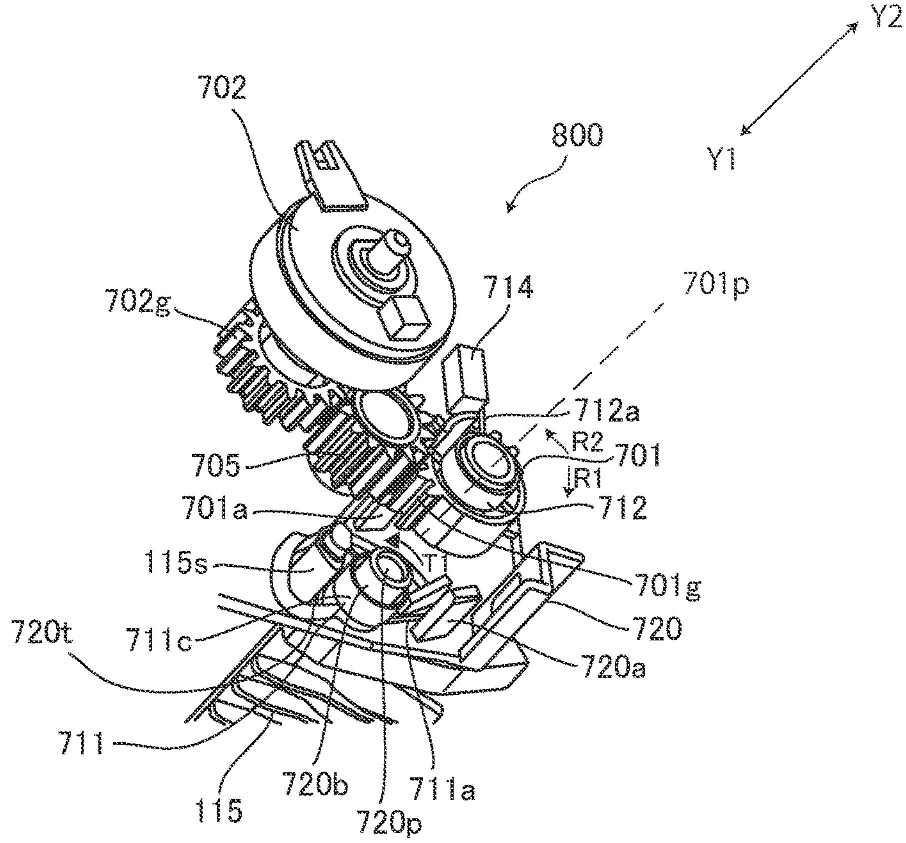
FIG. 4A is a perspective view illustrating a switching mechanism.
Figure 4B:
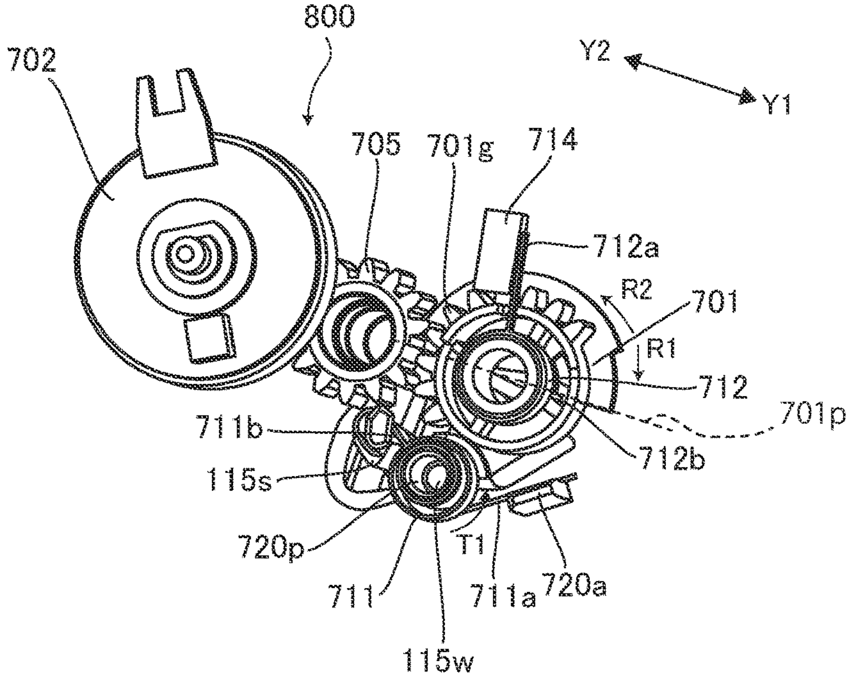
FIG. 4B is another perspective view illustrating the switching mechanism.

FIG. 4A is a perspective view illustrating the switching mechanism 800, and FIG. 4B is another perspective view illustrating the switching mechanism 800. FIGS. 4A and 4B are both views from an upstream perspective in the Y1 direction.

As illustrated in FIGS. 4A and 4B, the switching mechanism 800 includes an electromagnetic clutch 702, an idler gear 705, a switching gear 701, and a switching gear spring 712. In the present embodiment, the electromagnetic clutch 702, the idler gear 705, the switching gear 701, and the switching gear spring 712 are supported by the discharge frame 720. However, the electromagnetic clutch 702, the idler gear 705, the switching gear 701, and the switching gear spring 712 may be supported by other members.

The electromagnetic clutch 702 serving as a clutch is provided in a drive transmission path between the motor 30 (see FIG. 1) and the switching gear 701. The electromagnetic clutch 702 transitions to a transmission state where a driving force of the motor 30 is transmitted to a gear portion 702*g* of the electromagnetic clutch 702, when being in an energized state. When the electromagnetic clutch 702 is in a non-energized state, the electromagnetic clutch 702 transitions to a non-transmission state where the driving force of the motor 30 is not transmitted to the gear portion 702*g*.

In the present embodiment, the electromagnetic clutch 702 is used to transmit or not transmit the driving force of the motor 30 to the switching gear 701, but the present technology is not limited thereto. For example, instead of the electromagnetic clutch 702, another clutch such as a mechanical clutch, a hydraulic clutch, or a pneumatic clutch may be used.

The idler gear 705 meshes with the gear portion 702*g* of the electromagnetic clutch 702 and a gear portion 701*g* of the switching gear 701, and transmits rotation of the gear portion 702*g* to the gear portion 701*g*. The switching gear 701 serving as a guide moving member includes the gear portion 701*g* and a pressing portion 701*a*, and is rotatable about a rotation center 701*p*. That is, the switching gear 701 is configured to be rotatable about a rotation shaft extending in the Y direction, and the gear portion 701*g* receives the driving force from the motor 30. The switching gear 701 incorporates the switching gear spring 712 serving as a first urging member implemented by a torsion coil spring.

The discharge frame 720 is provided with regulating portions 714 and 720*a*, an opening portion 720*t* through which a pressed portion 115*s* of the guide member 115 passes, and a boss portion 720*b*. A fixed arm 712*a* of the switching gear spring 712 incorporated in the switching gear 701 is fixed to the regulating portion 720*a*, and an operating arm 712*b* of the switching gear spring 712 is engaged with the switching gear spring 712. The switching gear 701 is urged by the switching gear spring 712 in an R1 direction (clockwise direction) in FIGS. 4A and 4B about the rotation center 701*p*, and abuts against a stopper (not illustrated) to be positioned at a first position. In other words, the switching gear spring 712 urges the switching gear 701 toward the first position. In FIGS. 4A, 4B, and 5A to 5C, the switching gear 701 is positioned at the first position.

When the electromagnetic clutch 702 is energized to be in the energized state, the driving force is transmitted from the motor 30 to the switching gear 701, and the switching gear 701 rotates in an R2 direction opposite to the R1 direction which is a direction in which the switching gear 701 is urged by the switching gear spring 712. That is, the switching gear 701 rotates in the R2 direction against an urging force of the switching gear spring 712. The urging force of the switching gear spring 712 is set to be larger than a gear idling torque of the electromagnetic clutch 702.

The boss portion 720*b* of the discharge frame 720 is provided coaxially with the pivot center hole 720*p*, and a coil portion 711*c* of a spring 711 is attached to the boss portion 720*b*. A fixed arm 711*a* of the spring 711 serving as a second urging member is fixed to the regulating portion 720*a*, and an operating arm 711*b* of the spring 711 is engaged with an end portion of the pressed portion 115*s* of the guide member 115. The pressed portion 115*s* is disposed outside a conveyance region for the sheet S in the Y direction. The guide member 115 is urged in a T1 direction (a counterclockwise direction in FIGS. 4A and 4B) about the pivot center boss 115*w* as the pressed portion 115*s* is urged by the spring 711.

Figure 10A:
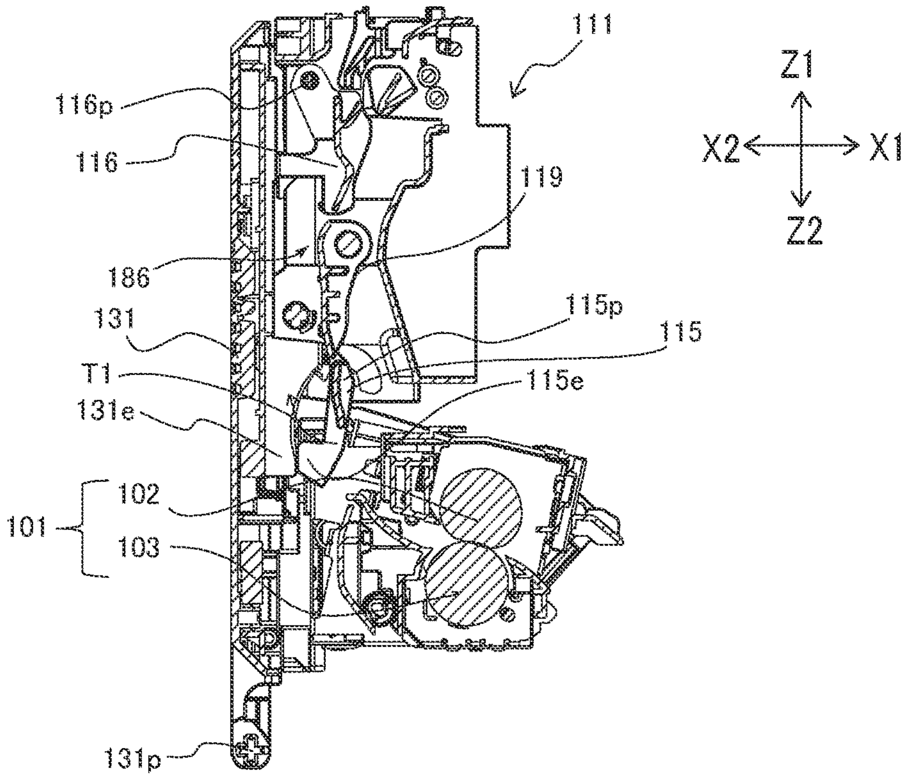
FIG. 10A is a cross-sectional view illustrating the discharge reversing unit in a state where the rear door is positioned at a closed position.

The guide member 115 urged in the T1 direction by the spring 711 abuts against a pivot regulating portion 131*e* of the rear door 131 in a state where the rear door 131 is positioned at the closed position as illustrated in FIG. 10A, as a result of which the guide member 115 is positioned at the discharge position.

Operations of Switching Mechanism and Guide Member

Next, operations of the switching mechanism 800 and the guide member 115 will be described with reference to FIGS. 5A to 13.

Figure 5A:
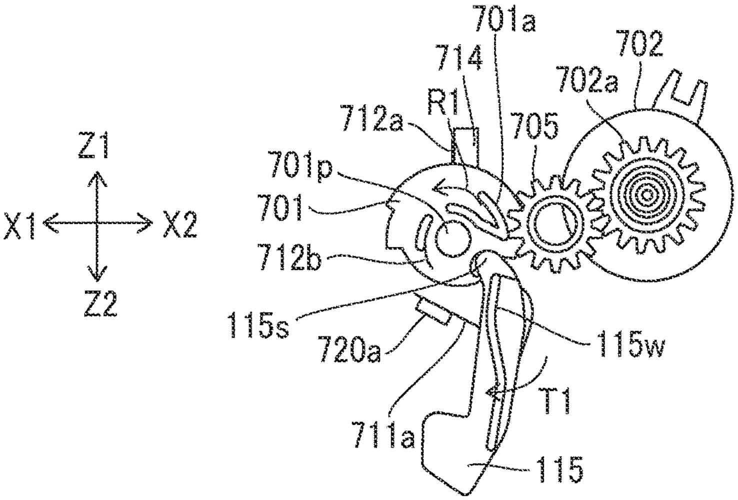
FIG. 5A is a cross-sectional view taken along line A1-A1 of FIG. 3.

FIGS. 5A to 9C illustrate positional relationships of five patterns of the guide member 115 and the switching gear 701. FIG. 5A is a cross-sectional view taken along line A1-A1 of FIG. 3 in a state where the guide member 115 is positioned at the discharge position and the switching gear 701 is positioned at the first position. FIG. 5B is a cross-sectional view taken along line B1-B1 of FIG. 3 in a state where the guide member 115 is positioned at the discharge position and the switching gear 701 is positioned at the first position. FIG. 5C is a side view of the discharge reversing unit 111 from an upstream perspective in the Y1 direction in a state where the guide member 115 is positioned at the discharge position and the switching gear 701 is positioned at the first position.

Figure 5B:
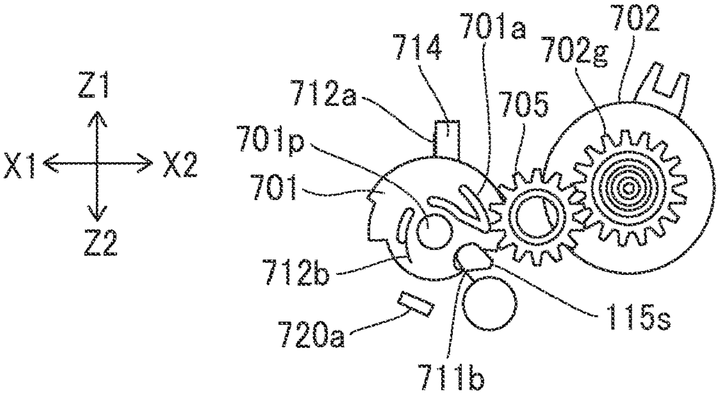
FIG. 5B is a cross-sectional view taken along line B1-B1 of FIG. 3.
Figure 5C:
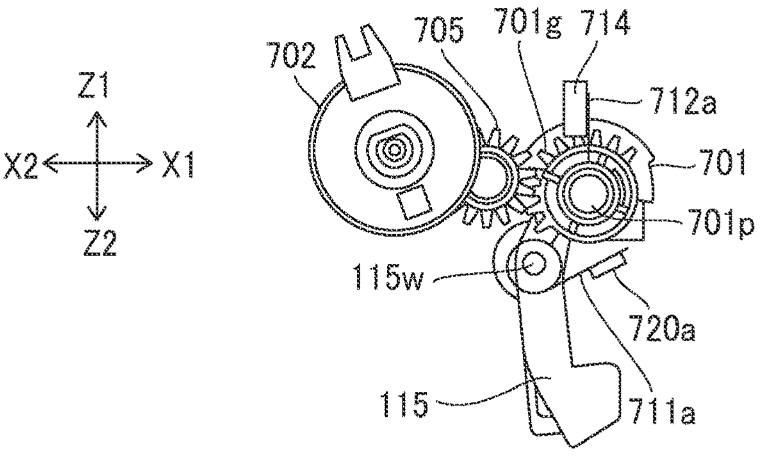
FIG. 5C is a side view illustrating the discharge reversing unit.

In FIGS. 5A to 5C, the rear door 131 is closed, and the electromagnetic clutch 702 is in the non-energized state. At this time, the driving force of the motor 30 is not transmitted to the switching gear 701. Therefore, the switching gear 701 is positioned at the first position illustrated in FIGS. 5A to 5C by the urging force of the switching gear spring 712. The guide member 115 is urged in the T1 direction by the spring 711 and abuts against the pivot regulating portion 131*e* (see FIG. 10A) of the rear door 131, as a result of which the guide member 115 is positioned at the discharge position.

Figure 6A:
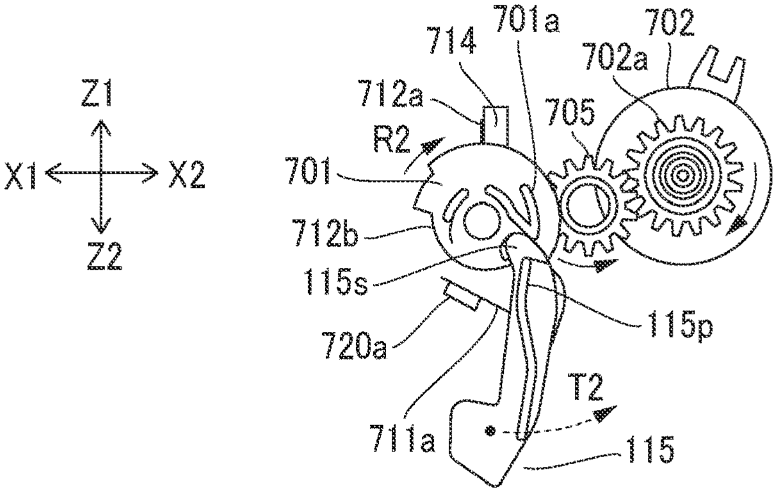
FIG. 6A is a cross-sectional view taken along line A1-A1 of FIG. 3.
Figure 6B:
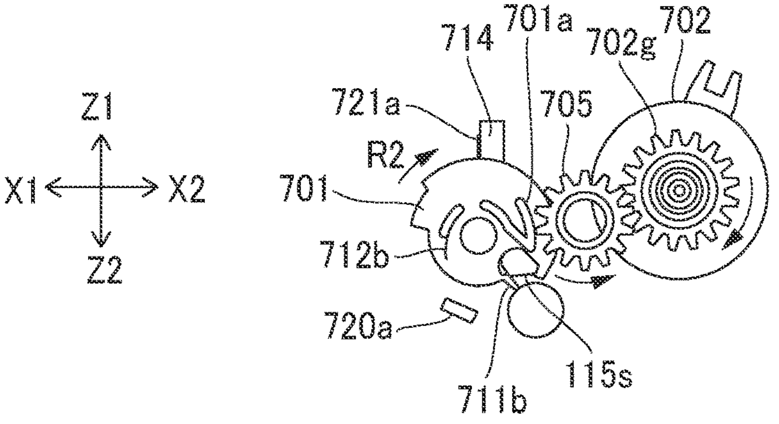
FIG. 6B is a cross-sectional view taken along line B1-B1 of FIG. 3.
Figure 6C:
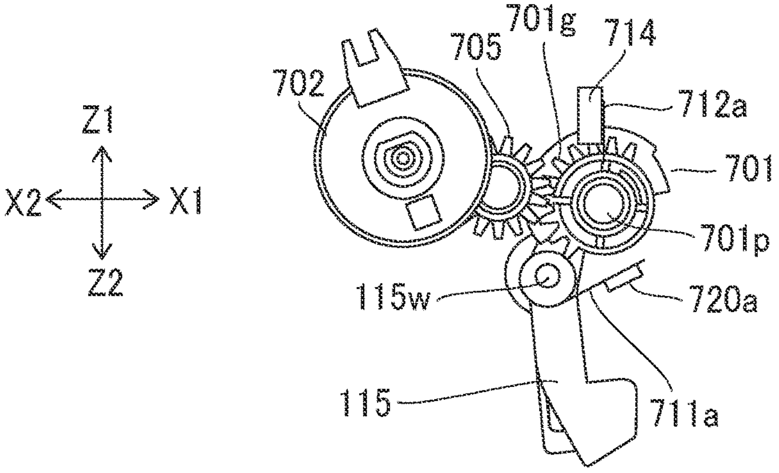
FIG. 6C is a side view illustrating the discharge reversing unit.

FIG. 6A is a cross-sectional view taken along line A1-A1 of FIG. 3 immediately before the guide member 115 moves from the discharge position to the reversing position and in the middle of the rotation of the switching gear 701 from the first position to the second position. FIG. 6B is a cross-sectional view taken along line B1-B1 of FIG. 3 immediately before the guide member 115 moves from the discharge position to the reversing position and in the middle of the rotation of the switching gear 701 from the first position to the second position. FIG. 6C is a side view of the discharge reversing unit 111 from an upstream perspective in the Y1 direction immediately before the guide member 115 moves from the discharge position to the reversing position and in the middle of the rotation of the switching gear 701 from the first position to the second position.

As illustrated in FIGS. 6A to 6C, when the electromagnetic clutch 702 is in the energized state, the driving force of the motor 30 is transmitted to the switching gear 701. As a result, the switching gear 701 rotates in the R2 direction against the urging force of the switching gear spring 712. When the switching gear 701 rotates in the R2 direction, the pressing portion 701*a* of the switching gear 701 abuts on the pressed portion 115*s* of the guide member 115 positioned at the discharge position. When the switching gear 701 further rotates in the R2 direction, the pressing portion 701*a* presses the pressed portion 115*s*, and the guide member 115 rotates in the T2 direction from the discharge position toward the reversing position.

Figure 7A:
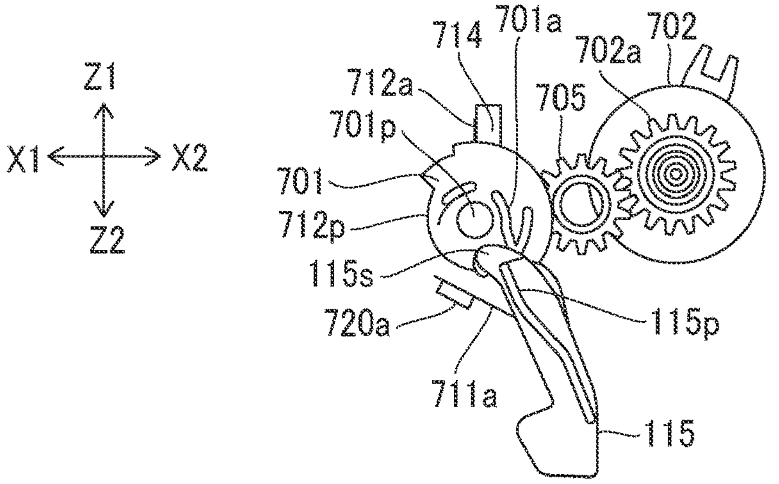
FIG. 7A is a cross-sectional view taken along line A1-A1 of FIG. 3.
Figure 7B:
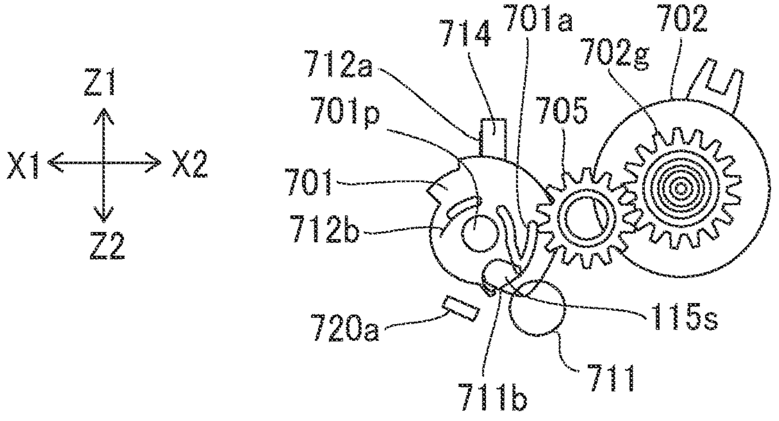
FIG. 7B is a cross-sectional view taken along line B1-B1 of FIG. 3.
Figure 7C:
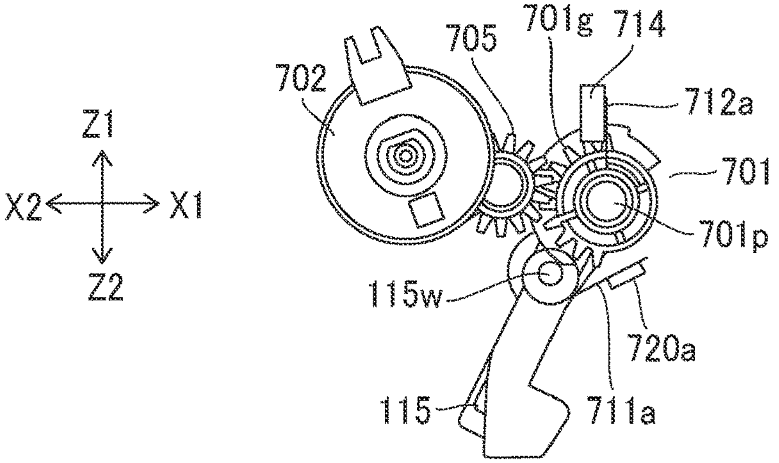
FIG. 7C is a side view illustrating the discharge reversing unit.

FIG. 7A is a cross-sectional view taken along line A1-A1 of FIG. 3 in a state where the guide member 115 is positioned at the reversing position and the switching gear 701 is positioned at the second position. FIG. 7B is a cross-sectional view taken along line B1-B1 of FIG. 3 in a state where the guide member 115 is positioned at the reversing position and the switching gear 701 is positioned at the second position. FIG. 7C is a side view of the discharge reversing unit 111 from an upstream perspective in the Y1 direction in a state where the guide member 115 is positioned at the reversing position and the switching gear 701 is positioned at the second position.

When the pressing portion 701*a* presses the pressed portion 115*s* to cause the guide member 115 to reach the reversing position as illustrated in FIGS. 7A to 7C, the guide member 115 abuts against a regulating portion (not illustrated) and stops. At this time, the driving force of the motor 30 is transmitted to the electromagnetic clutch 702 via a torque limiter (not illustrated) provided in a drive transmission path between the motor 30 and the electromagnetic clutch 702. A torque limit value at which drive connection of the torque limiter is interrupted is larger than the urging force of the spring 711 when the guide member 115 is positioned at the reversing position. Therefore, the guide member 115 maintains the reversing position as long as the motor 30 is driven and the electromagnetic clutch 702 is in the energized state. When the rear door 131 is opened while the electromagnetic clutch 702 is in the energized state, the electromagnetic clutch 702 transitions to the non-energized state. When the electromagnetic clutch 702 is in the non-energized state, the switching gear 701 is positioned at the first position.

Figure 8A:
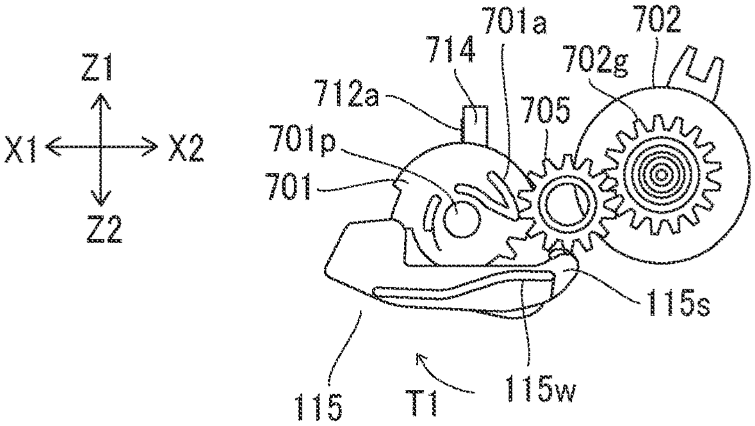
FIG. 8A is a cross-sectional view taken along line A1-A1 of FIG. 3.
Figure 8B:
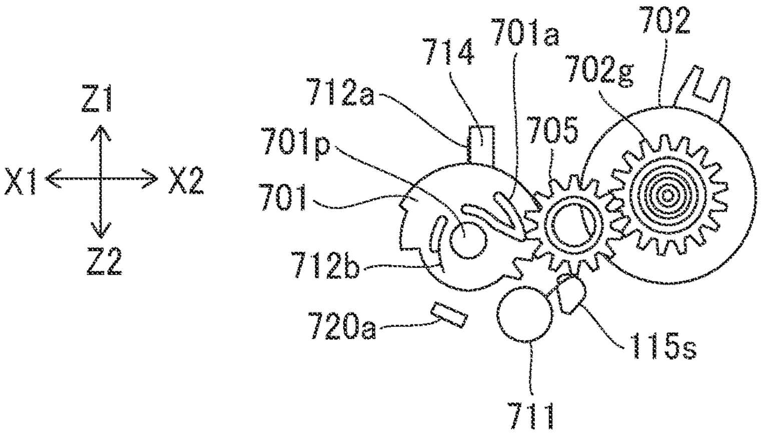
FIG. 8B is a cross-sectional view taken along line B1-B1 of FIG. 3.
Figure 8C:
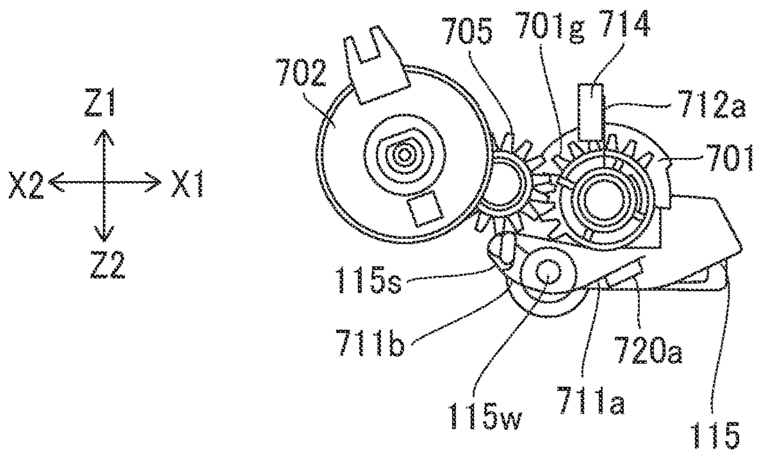
FIG. 8C is a side view illustrating the discharge reversing unit.

FIG. 8A is a cross-sectional view taken along line A1-A1 of FIG. 3 in a state where the guide member 115 is positioned at a first jam handling position and the switching gear 701 is positioned at the first position. FIG. 8B is a cross-sectional view taken along line B1-B1 of FIG. 3 in a state where the guide member 115 is positioned at the first jam handling position and the switching gear 701 is positioned at the first position. FIG. 8C is a side view of the discharge reversing unit 111 from an upstream perspective in the Y1 direction in a state where the guide member 115 is positioned at the first jam handling position and the switching gear 701 is positioned at the first position.

Figure 9A:
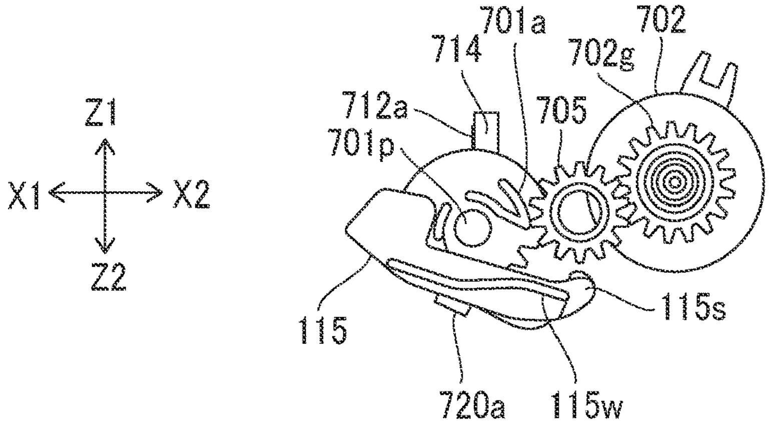
FIG. 9A is a cross-sectional view taken along line A1-A1 of FIG. 3.
Figure 9B:
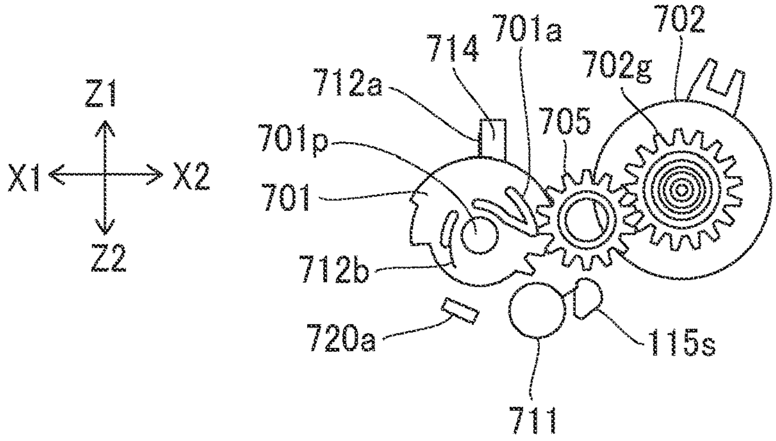
FIG. 9B is a cross-sectional view taken along line B1-B1 of FIG. 3.
Figure 9C:
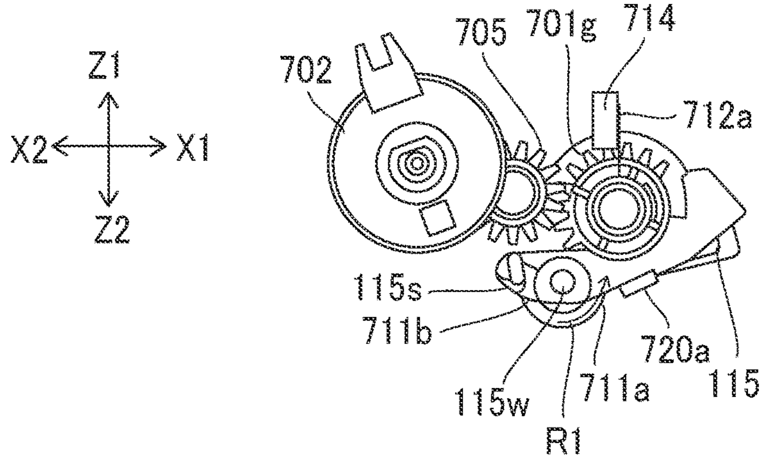
FIG. 9C is a side view illustrating the discharge reversing unit.

FIG. 9A is a cross-sectional view taken along line A1-A1 of FIG. 3 in a state where the guide member 115 is positioned at a second jam handling position and the switching gear 701 is positioned at the first position. FIG. 9B is a cross-sectional view taken along line B1-B1 of FIG. 3 in a state where the guide member 115 is positioned at the second jam handling position and the switching gear 701 is positioned at the first position. FIG. 9C is a side view of the discharge reversing unit 111 from an upstream perspective in the Y1 direction in a state where the guide member 115 is positioned at the second jam handling position and the switching gear 701 is positioned at the first position.

Figure 10B:
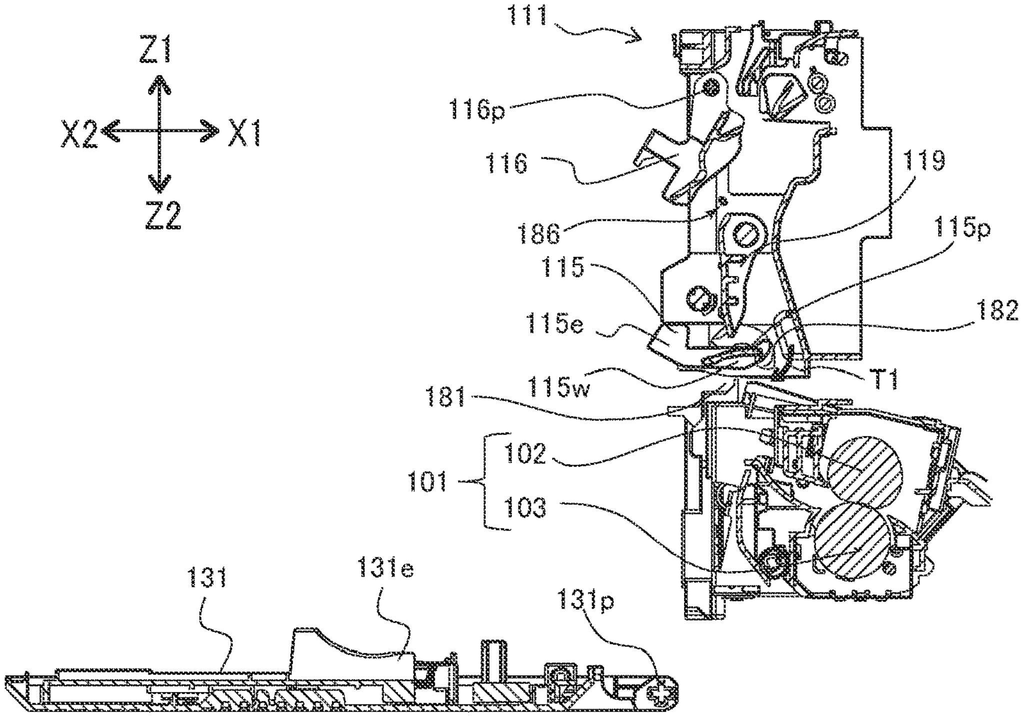
FIG. 10B is a cross-sectional view illustrating the discharge reversing unit in a state where the rear door is positioned at an open position.

FIG. 10A is a cross-sectional view illustrating the discharge reversing unit 111 in a state where the rear door 131 is positioned at the closed position, and FIG. 10B is a cross-sectional view illustrating the discharge reversing unit 111 in a state where the rear door 131 is positioned at the open position.

Figure 11A:
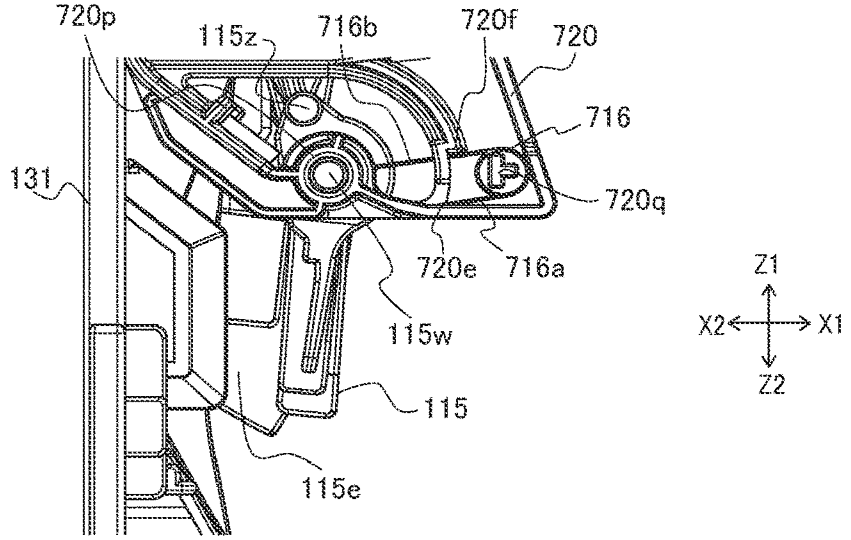
FIG. 11A is a side view illustrating a position regulating spring when a guide member is positioned at a discharge position.
Figure 11B:
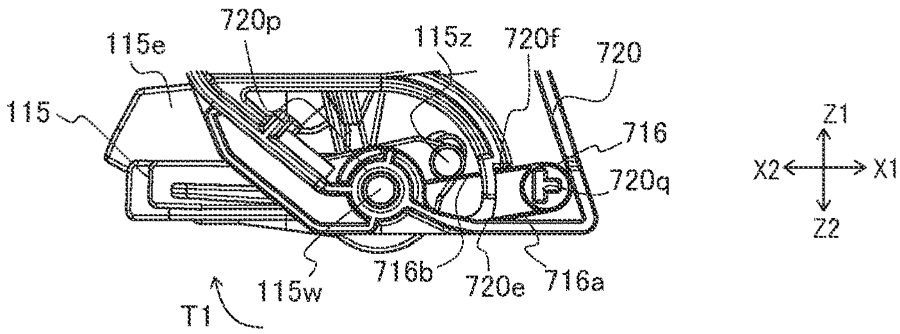
FIG. 11B is a side view illustrating the position regulating spring when the guide member is positioned at a first jam handling position.
Figure 11C:
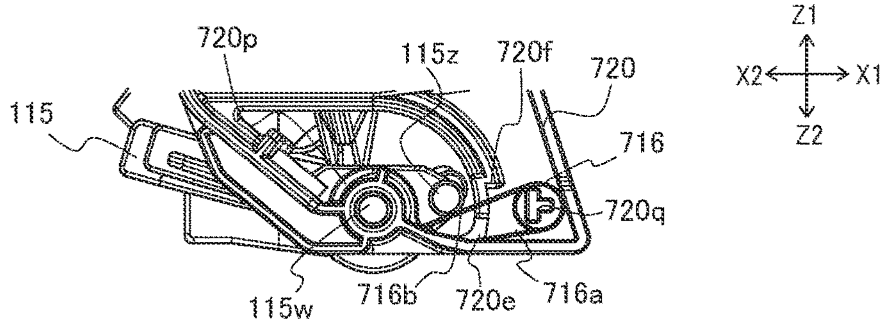
FIG. 11C is a side view illustrating the position regulating spring when the guide member is positioned at a second jam handling position.

FIG. 11A is a side view of the position regulating spring 716 from an upstream perspective in the Y2 direction when the guide member 115 is positioned at the discharge position. FIG. 11B is a side view of the position regulating spring 716 from an upstream perspective in the Y2 direction when the guide member 115 is positioned at the first jam handling position. FIG. 11C is a side view of the position regulating spring 716 from an upstream perspective in the Y2 direction when the guide member 115 is positioned at the second jam handling position.

Figure 12A:
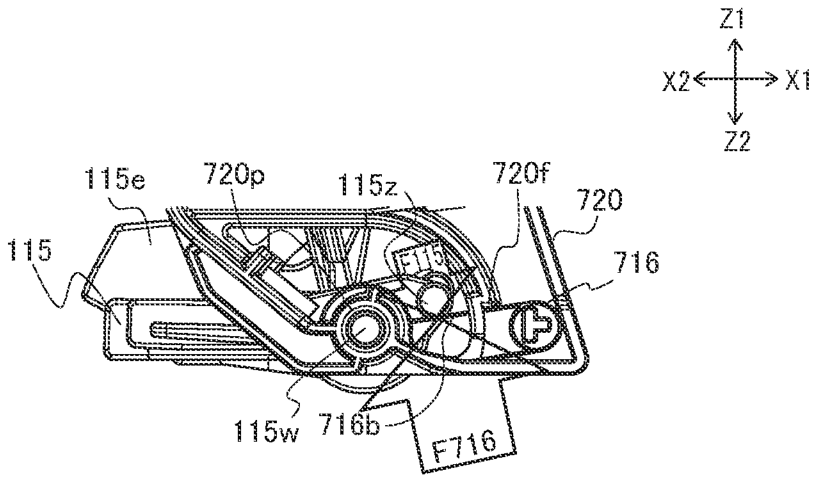
FIG. 12A is a side view for describing a force acting on a rotation regulating boss when the guide member is positioned at the first jam handling position.
Figure 12B:
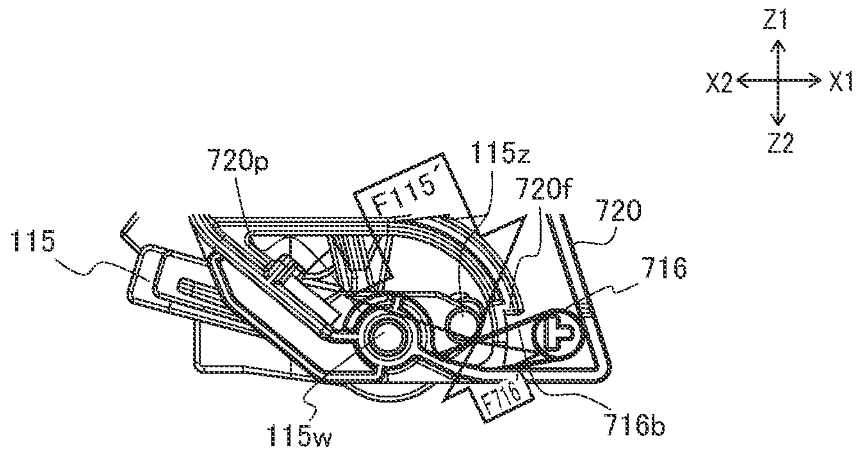
FIG. 12B is a side view for describing a force acting on the rotation regulating boss when the guide member is positioned at the second jam handling position.
Figure 13:
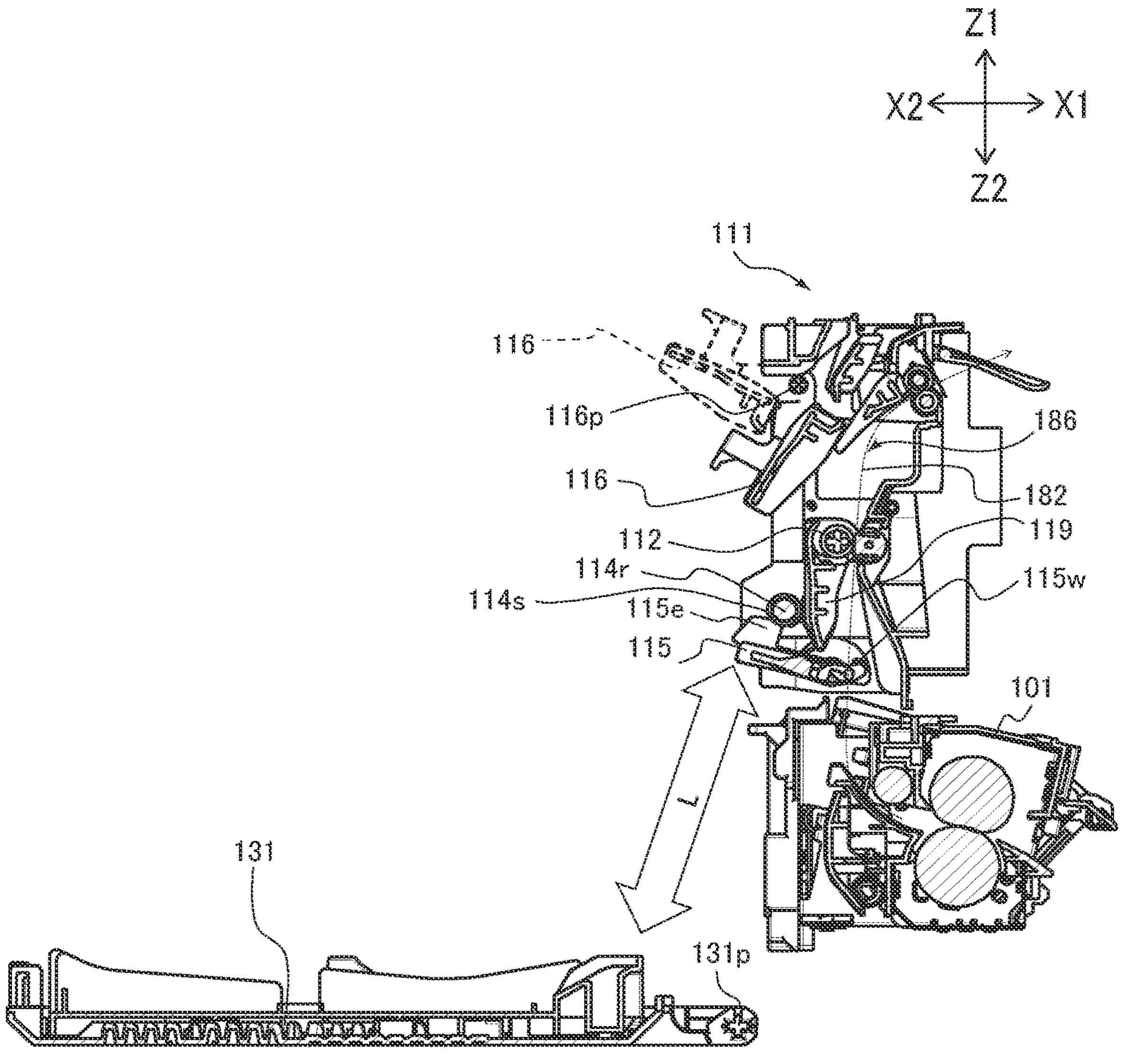
FIG. 13 is a cross-sectional view illustrating the guide member positioned at the second jam handling position.

FIG. 12A is a side view for describing a force acting on a pivot regulating boss 115*z* when the guide member 115 is positioned at the first jam handling position. FIG. 12B is a side view for describing a force acting on the pivot regulating boss 115*z* when the guide member 115 is positioned at the second jam handling position. FIGS. 12A and 12B are both views from an upstream perspective in the Y2 direction. FIG. 13 is a cross-sectional view illustrating the guide member 115 positioned at the second jam handling position.

As illustrated in FIG. 10B, when the rear door 131 is opened, the rear door 131 is separated from the guide member 115. Therefore, the guide member 115 urged in the T1 direction by the spring 711 pivots about the pivot center boss 115*p* toward the first jam handling position serving as a first retraction position illustrated in FIGS. 8A and 10B. In other words, the spring 711 urges the guide member 115 toward the first jam handling position. When the guide member 115 is at the first jam handling position and the second jam handling position described below, the sheet conveyance path 186 is opened and exposed to the outside of the apparatus body 1A. At this time, the discharge conveyance path 182 covered with the guide member 115 is also opened and exposed to the outside of the apparatus body 1A. That is, the guide member 115 opens the sheet conveyance path 186 including the discharge conveyance path 182 at the first jam handling position and the second jam handling position. When the rear door 131 is positioned at the open position, the reverse conveyance path 181 is opened. The first jam handling position and the second jam handling position are different from the positions (the discharge position and the reversing position) at which the guide member 115 conveys the sheet S. In the present embodiment, in a state where the rear door 131 is closed, the guide member 115 is restricted from moving to the first jam handling position and the second jam handling position. In a state where the rear door 131 is opened, an operation of conveying the sheet S is restricted. Therefore, the guide member 115 does not guide the sheet S at the first jam handling position and the second jam handling position.

Here, as illustrated in FIGS. 11A to 11C, the discharge frame 720 is provided with a support portion 720*q* and regulating portions 720*e* and 720*f*, and the support portion 720*q* supports the position regulating spring 716 serving as an elastic member implemented by a torsion coil spring. A fixed arm 716*a* of the position regulating spring 716 abuts on the regulating portion 720*e*, and an operating arm 716*b* of the position regulating spring 716 abuts on the regulating portion 720*f*.

The pivot regulating boss 115*z* is provided at an upstream end portion of the guide member 115 in the Y2 direction, and the pivot regulating boss 115*z* is configured to be able to abut on the operating arm 716*b* of the position regulating spring 716. When the guide member 115 is positioned at the discharge position and the reversing position illustrated in FIG. 11A, the pivot regulating boss 115*z* is separated from the operating arm 716*b* of the position regulating spring 716.

As illustrated in FIGS. 8A to 8C and 11B, when the rear door 131 is opened and the guide member 115 pivots in the T1 direction about the pivot center boss 115*p* by the urging force of the spring 711, the pivot regulating boss 115*z* abuts on the operating arm 716*b*. At this time, as illustrated in FIG. 12A, a force by which the operating arm 716*b* abutting on the regulating portion 720*f* presses the pivot regulating boss 115*z* is set to be larger than a force F115 by which the pivot regulating boss 115*z* presses the operating arm 716*b* by the urging force of the spring 711. Therefore, the guide member 115 is positioned at the first jam handling position illustrated in FIGS. 8A, 11B, and 12B when the pivot regulating boss 115*z* abuts against the operating arm 716*b*.

When the rear door 131 is opened from the closed position to the open position, the intermediate conveyance guide 116 pivots by its own weight about the pivot center hole 116*p* from a guide position illustrated in FIG. 10A to a jam handling position illustrated in FIG. 10B. In this state, the user can handle a jam in the discharge conveyance path 182 between the relay guide 119 and the intermediate conveyance guide 116.

As illustrated in FIG. 13, for example, when removing the fixing portion 101 from the apparatus body 1A and handling a jam in the discharge conveyance path 182, the user can manually lift the guide member 115 to pivot the guide member 115 to the second jam handling position illustrated in FIG. 13. By doing so, the sheet conveyance path 186 is further opened. In addition, a work space L between the guide member 115 and the rear door 131 is widened, and maintainability can be improved.

As illustrated in FIGS. 9A to 9C and 13, when the user pivots the guide member 115 to the second jam handling position serving as a second retraction position, the pivot regulating boss 115*z* of the guide member 115 is positioned at a position illustrated in FIG. 11C. The second jam handling position is a position opposite to both of the discharge position and the reversing position with respect to the first jam handling position. At this time, as illustrated in FIG. 12B, a force F115' by which the pivot regulating boss 115*z* presses the operating arm 716*b* by a user operation of pivoting the guide member 115 to the second jam handling position becomes larger than a force by which the operating arm 716*b* presses the pivot regulating boss 115*z*. That is, the pivot regulating boss 115*z* presses and elastically deforms the operating arm 716*b* of the position regulating spring 716 downward, and the operating arm 716*b* is separated from the regulating portion 720*f*.

As illustrated in FIG. 13, when the guide member 115 is positioned at the second jam handling position, a pivot regulated portion 115*e* of the guide member 115 abuts on a rotation shaft 114*s* of the reverse driving roller 114*r*. Therefore, the guide member 115 is not opened upward from the second jam handling position.

In the present embodiment, the position regulating spring 716 is implemented by a torsion coil spring. However, the position regulating spring 716 is not limited thereto. For example, the position regulating spring 716 may also be implemented by an elastic member such as a leaf spring, a torsion bar, a sponge, or rubber.

Positional Relationship Between Pressed Portion and Pressing Portion

Figure 14A:
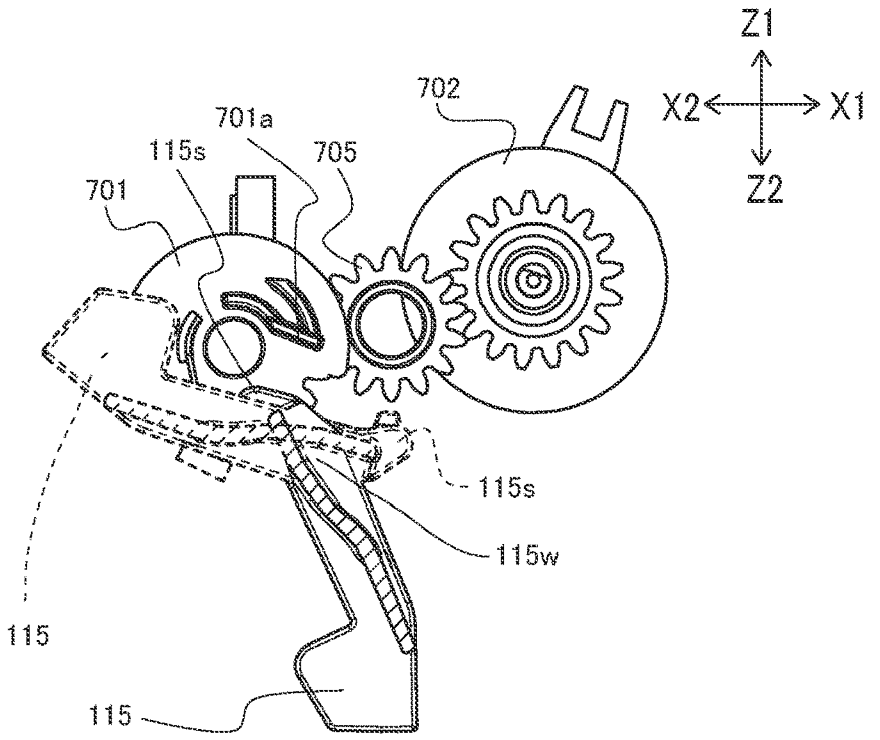
FIG. 14A is a cross-sectional view illustrating a positional relationship between a pressed portion of the guide member and a pressing portion of a switching gear.

Next, a positional relationship between the pressed portion 115*s* of the guide member 115 and the pressing portion 701*a* of the switching gear 701 will be described with reference to FIGS. 14A and 14B. FIG. 14A is a cross-sectional view illustrating the positional relationship between the pressed portion 115*s* of the guide member 115 and the pressing portion 701*a* of the switching gear 701, and FIG. 14B is a cross-sectional view illustrating a positional relationship between a movement locus 115*k* of the pressed portion 115*s* and the pressing portion 701*a* of the switching gear 701.

Figure 14B:
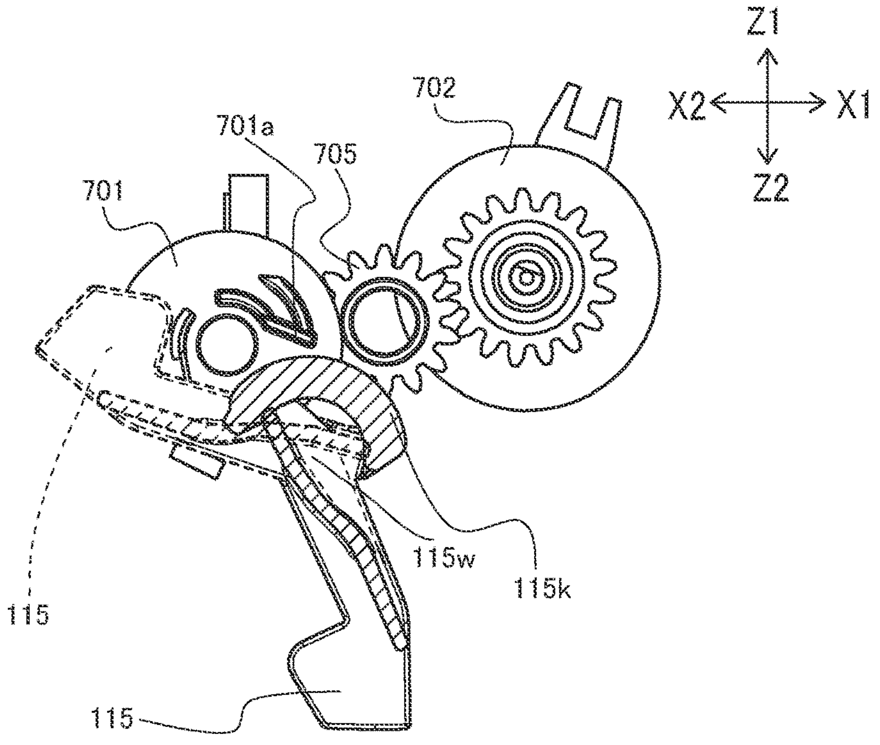
FIG. 14B is a cross-sectional view illustrating a positional relationship between a movement locus of the pressed portion and the pressing portion of the switching gear.

In FIGS. 14A and 14B, the guide member 115 indicated by the solid line is positioned at the reversing position, and the guide member 115 indicated by the broken line is positioned at the second jam handling position. In FIGS. 14A and 14B, the switching gear 701 is positioned at the first position. An arc-shaped region indicated by hatching in FIG. 14B indicates the movement locus 115*k* of the pressed portion 115*s* in a case where the guide member 115 moves between the reversing position and the second jam handling position. That is, the movement locus 115*k* is a space through which the pressed portion 115*s* passes in a case where the guide member 115 moves between the reversing position and the second jam handling position. In other words, the movement locus 115*k* is a movement locus of the pressed portion 115*s* in a case where the guide member 115 moves between the discharge position, the reversing position, the first jam handling position, and the second jam handling position. The movement locus 115*k* includes a movement locus of the pressed portion 115*s* in a case where the guide member 115 moves between the discharge position, the reversing position, and the first jam handling position.

In the present embodiment, as illustrated in FIG. 14B, the pressing portion 701*a* of the switching gear 701 positioned at the first position is disposed at a position not overlapping the movement locus of the pressed portion 115*s* in a case where the guide member 115 moves between the discharge position, the reversing position, and the first jam handling position. Therefore, in a case where the guide member 115 moves to the first jam handling position, the pressed portion 115*s* does not come into contact with the pressing portion 701*a* of the switching gear 701.

In the present embodiment, as illustrated in FIG. 14B, the pressing portion 701*a* of the switching gear 701 positioned at the first position is disposed at a position not overlapping the movement locus 115*k*. Therefore, in a case where the user operates the guide member 115 from the first jam handling position to the second jam handling position, the pressed portion 115*s* does not come into contact with the pressing portion 701*a* of the switching gear 701. When the guide member 115 is positioned at the first jam handling position and the second jam handling position, the rear door 131 is positioned at the open position, and the electromagnetic clutch 702 is in the non-energized state. At this time, the switching gear 701 is positioned at the first position. Therefore, even in a case where the user operates the guide member 115 from the first jam handling position to the second jam handling position, a load necessary for pivoting the switching gear 701 and the gear portion 702*g* of the electromagnetic clutch 702 is not applied to the user. Therefore, a force for operating the guide member 115 can be reduced, and operability of the guide member 115 can be improved.

When the switching gear 701 moves from the first position to the second position, that is, when the rear door 131 is positioned at the closed position and the electromagnetic clutch 702 transitions from the non-energized state to the energized state, the guide member 115 is positioned at the discharge position. When the switching gear 701 is positioned at the first position, the pressing portion 701*a* is separated from the pressed portion 115*s* as illustrated in FIGS. 5A to 5C. As illustrated in FIGS. 6A to 6C, when the switching gear 701 moves from the first position to the second position, the pressing portion 701*a* comes into contact with the pressed portion 115*s*.

That is, when the switching gear 701 moves from the first position to the second position, the pressed portion 115*s* is positioned downstream in a movement direction of the pressing portion 701*a*. Therefore, the pressing portion 701*a* and the pressed portion 115*s* are configured such that the pressed portion 115*s* is not positioned upstream in the movement direction of the pressing portion 701*a*. Therefore, the guide member 115 can stably pivot.

Operation of Guide Member when Closing Rear Door

Figure 15A:
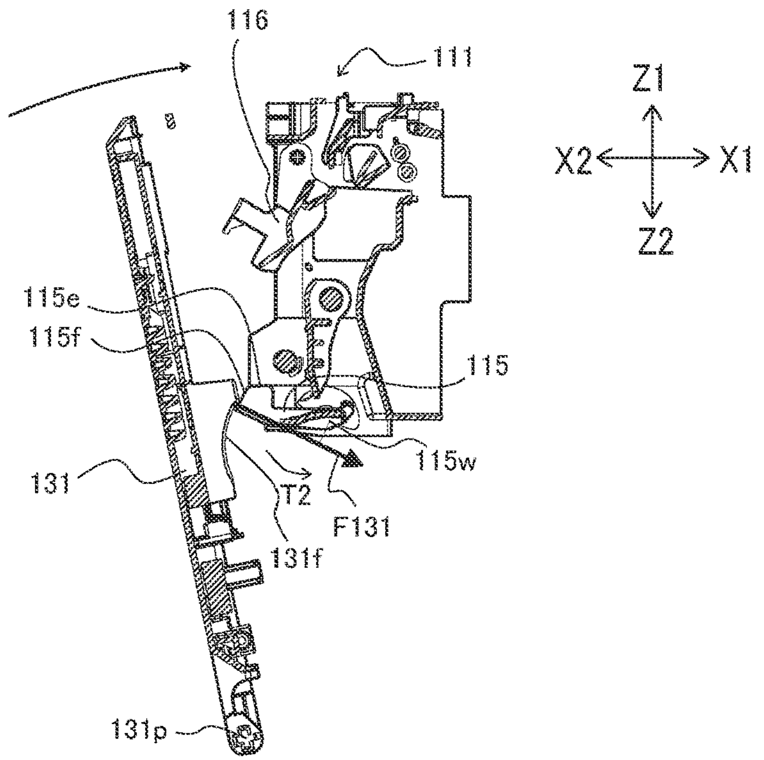
FIG. 15A is a cross-sectional view illustrating a state where a cam of the rear door abuts on a cam of the guide member positioned at the first jam handling position.
Figure 15B:
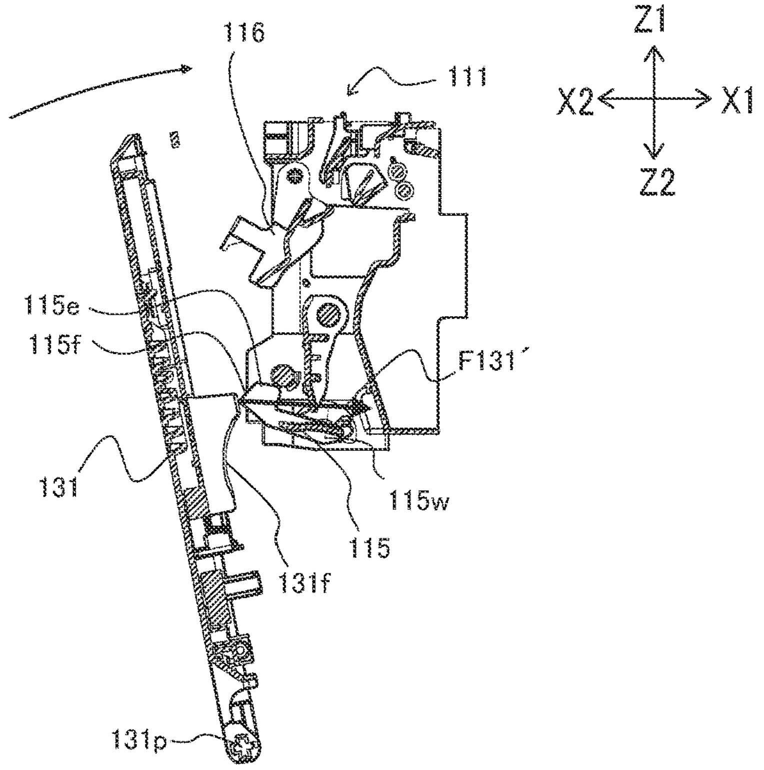
FIG. 15B is a cross-sectional view illustrating a state where the cam of the rear door abuts on the cam of the guide member positioned at the second jam handling position.

Next, an operation of the guide member 115 when closing the rear door 131 from the open position to the closed position will be described with reference to FIGS. 15A and 15B. FIG. 15A is a cross-sectional view illustrating a state where a cam 131*f* of the rear door 131 and a cam 115*f* of the guide member 115 positioned at the first jam handling position abut on each other. FIG. 15B is a cross-sectional view illustrating a state where the cam 131*f* of the rear door 131 and the cam 115*f* of the guide member 115 positioned at the second jam handling position abut on each other.

As illustrated in FIG. 15A, once the rear door 131 is opened, the guide member 115 is held at the first jam handling position by the actions of the spring 711 and the position regulating spring 716 described above. When the user closes the rear door 131 from the open position to the closed position, the cam 131*f* of the rear door 131 abuts on the cam 115*f* of the guide member 115 positioned at the first jam handling position.

At this time, a direction of a force F131 received by the cam 115*f* from the cam 131*f* always passes below the pivot center boss 115*w* of the guide member 115 in the vertical direction (Z direction). That is, the guide member 115 pivots in the T2 direction about the pivot center boss 115*w* toward the discharge position by the force F131.

As illustrated in FIG. 10A, when the rear door 131 is positioned at the closed position, the guide member 115 abuts against the rear door 131 positioned at the closed position and is held at the discharge position. When the rear door 131 is closed from the open position to the closed position, the intermediate conveyance guide 116 is pressed by the rear door 131 and pivots from the jam handling position illustrated in FIG. 10B to the guide position illustrated in FIG. 10A.

Here, a case where the rear door 131 is closed when the guide member 115 is positioned at the second jam handling position as illustrated in FIG. 15B is considered. At this time, a direction of a force F131' received by the cam 115*f* from the cam 131*f* passes above the pivot center boss 115*w* of the guide member 115 in the vertical direction (Z direction). That is, the guide member 115 tends to further pivot upward from the second jam handling position by the force F131'.

However, in the present embodiment, as illustrated in FIGS. 11A to 11C, the position regulating spring 716 for holding the guide member 115 at the first jam handling position when the rear door 131 is opened is provided. Therefore, when the rear door 131 is closed, the guide member 115 is positioned at the first jam handling position. That is, when the user releases his/her hand from the guide member 115, the guide member 115 is automatically held at the first jam handling position by the urging force of the position regulating spring 716.

Since the guide member 115 and the intermediate conveyance guide 116 pivot to the discharge position and the guide position, respectively, in conjunction with an operation of closing the rear door 131 as described above, usability can be improved.

Operation of Attaching and Detaching Fixing Portion

Figure 16A:
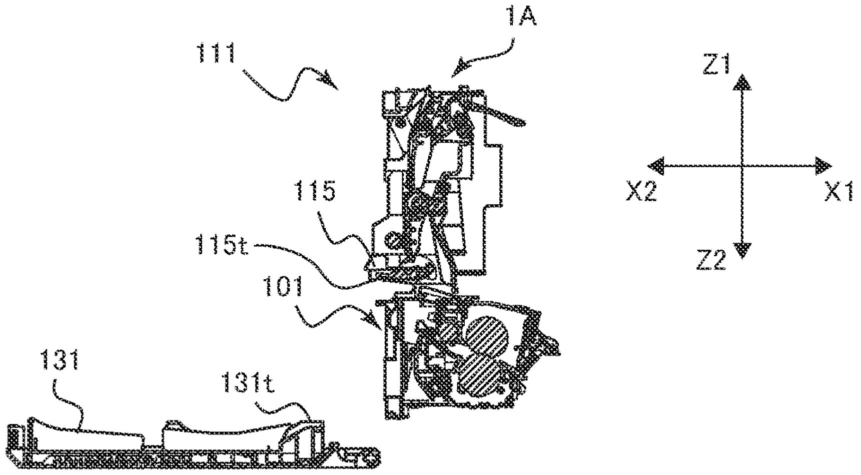
FIG. 16A is a cross-sectional view illustrating a state where the rear door is positioned at the open position and a fixing portion is positioned at a mounting position.
Figure 16B:
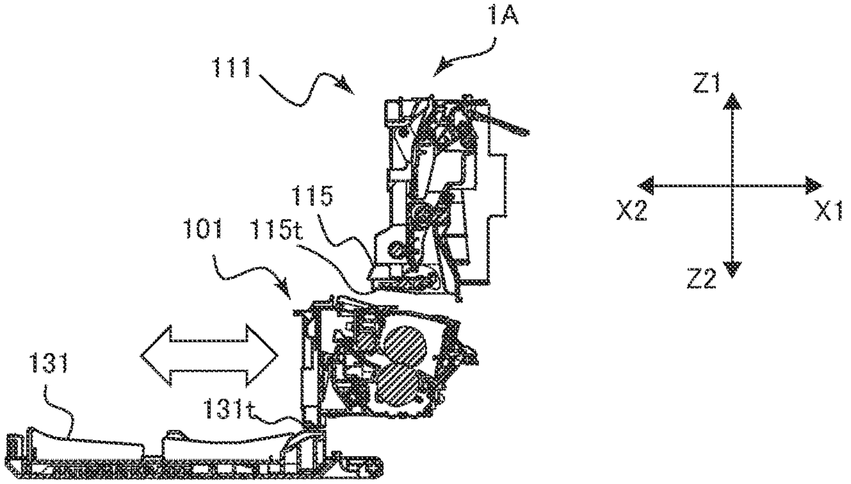
FIG. 16B is a cross-sectional view illustrating a state where the fixing portion is pulled out from an apparatus body.
Figure 16C:
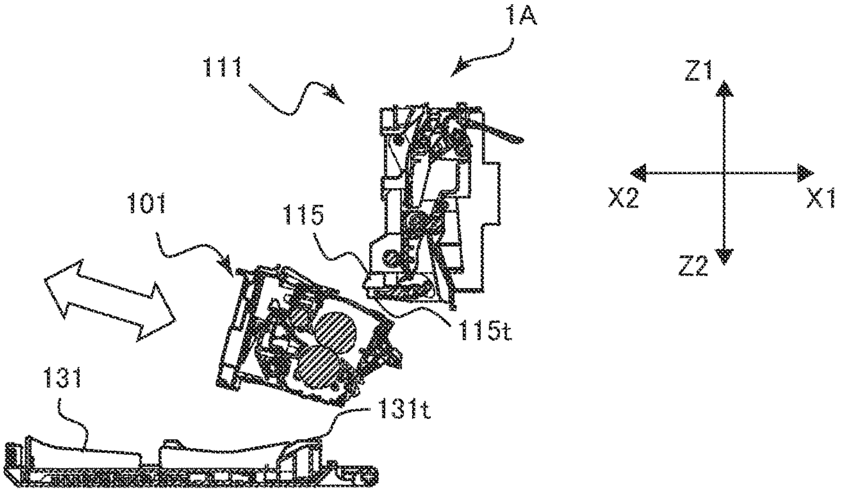
FIG. 16C is a cross-sectional view illustrating a state where the fixing portion is further pulled out from the apparatus body.

FIG. 16A is a cross-sectional view illustrating a state where the rear door 131 is positioned at the open position and the fixing portion 101 is positioned at a mounting position. FIG. 16B is a cross-sectional view illustrating a state where the fixing portion 101 is pulled out from the apparatus body 1A. FIG. 16C is a cross-sectional view illustrating a state where the fixing portion 101 is further pulled out from the apparatus body 1A.

As illustrated in FIG. 16A, when removing the fixing portion 101 from the frame (not illustrated) of the apparatus body 1A, the user first moves the rear door 131 to the open position. At this time, as described above, the guide member 115 moves to the first jam handling position by the urging force of the spring 711. A lower end portion 115*t* of the guide member 115 positioned at the first jam handling position is positioned above the fixing portion 101 positioned at the mounting position in the vertical direction (Z direction). An upper end portion 131*t* of the rear door 131 positioned at the open position is positioned below the fixing portion 101 positioned at the mounting position in the vertical direction (Z direction).

Therefore, as the rear door 131 is opened to the open position, the fixing portion 101 is movable in the X2 direction through between the lower end portion 115*t* of the guide member 115 and the upper end portion 131*t* of the rear door 131. As illustrated in FIG. 16B, the user can remove the fixing portion 101 in the X2 direction aligned with the horizontal direction with respect to the frame (not illustrated) of the apparatus body 1A. Then, as illustrated in FIG. 16C, the user can take out the fixing portion 101 from the frame (not illustrated) of the apparatus body 1A by further moving the fixing portion 101 in a direction between the X2 direction and the Z1 direction.

The apparatus body 1A may include a guide rail that guides the fixing portion 101 from, for example, the mounting position illustrated in FIG. 16A to a position illustrated in FIG. 16B. In addition, the user may remove the fixing portion 101 from the apparatus body 1A in a state where the guide member 115 is lifted from the first jam handling position to the second jam handling position.

When mounting the fixing portion 101 on the apparatus body 1A, an operation opposite to the operation of removing the fixing portion 101 from the apparatus body 1A may be performed. In this manner, the fixing portion 101 can be attached to and detached from the apparatus body 1A by opening the rear door 131 to the open position, so that the maintainability and the jam handling performance can be improved.

As described above, in the present embodiment, the pressing portion 701*a* of the switching gear 701 positioned at the first position is disposed at a position not overlapping the movement locus 115*k* of the pressed portion 115*s* of the guide member 115 as described with reference to FIG. 10B.

Therefore, in a case where the user operates the guide member 115 from the first jam handling position to the second jam handling position, the pressed portion 115*s* does not come into contact with the pressing portion 701*a* of the switching gear 701. Therefore, even in a case where the user operates the guide member 115 from the first jam handling position to the second jam handling position, a load necessary for pivoting the switching gear 701 and the gear portion 702*g* of the electromagnetic clutch 702 is not applied to the user. Therefore, a force for operating the guide member 115 can be reduced, and operability of the guide member 115 can be improved.

Further, the load is not applied to the guide member 115 even when the rear door 131 is opened and the guide member 115 pivots to the first jam handling position by the urging force of the spring 711. Therefore, not only the force for the user to operate the guide member 115 but also the urging force required for the spring 711 can be reduced, so that the inexpensive or small spring 711 can be selected. Therefore, the image forming apparatus 1 can be downsized or reduced in cost.

Second Embodiment

Next, a second embodiment of the present invention will be described. The second embodiment is different from the first embodiment in a configuration of a switching mechanism 800. Therefore, a configuration similar to that of the first embodiment will be described in a manner of omitting illustration or attaching the same reference numerals in the drawings.

Figure 17A:
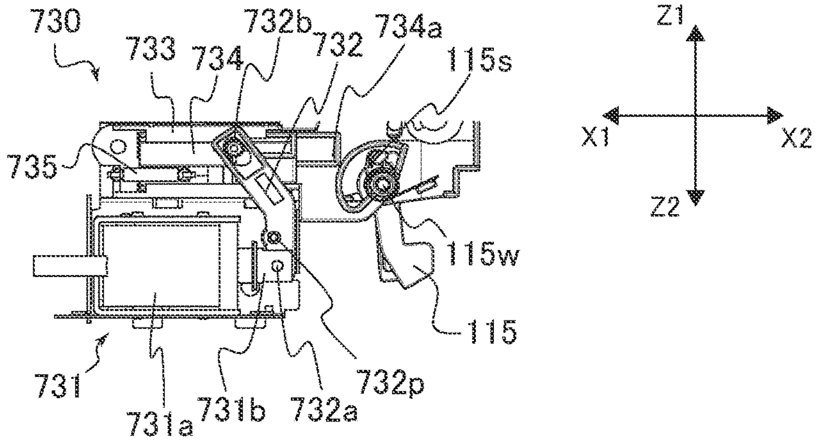
FIG. 17A is a side view illustrating a switching mechanism according to a second embodiment.

A switching mechanism 730 according to the second embodiment will be described with reference to FIG. 17A. FIG. 17A is a side view of the switching mechanism 730 from an upstream perspective in the Y1 direction in a state where a guide member 115 is positioned at a discharge position and a switching slider 734 is positioned at a first position.

As illustrated in FIG. 17A, the switching mechanism 730 according to the second embodiment includes a solenoid 731, a link 732, a rail 733, the switching slider 734, and a separation spring 735.

The solenoid 731 serving as a drive source includes a body portion 731*a* and a plunger 731*b* capable of reciprocating with respect to the body portion 731*a*. The body portion 731*a* includes an electromagnetic coil (not illustrated) wound around the plunger 731*b*. When a current flows through the coil, the plunger 731*b* is attracted toward the body portion 731*a*.

The link 732 is pivotable about a pivot center 732*p*, and includes an engagement portion 732*a* that engages with the plunger 731*b* and an engagement portion 732*b* that engages with the switching slider 734. The switching slider 734 is supported on the rail 733 so as to be slidable in the X direction. The plunger 731*b* is coupled to the switching slider 734 via the link 732, and thus interlocks with the switching slider 734. The switching slider 734 serving as a guide moving member includes a pressing portion 734*a* capable of pressing a pressed portion 115*s* of the guide member 115.

A first end of the separation spring 735 that is a tension spring is locked to the rail 733, and a second end of the separation spring 735 is locked to the switching slider 734. In a case where no current flows through the electromagnetic coil of the solenoid 731, the switching slider 734 moves downstream in the X1 direction by an urging force of the separation spring 735 and abuts against the rail 733 to be positioned at the first position. In other words, the separation spring 735 serving as a first urging member urges the switching slider 734 toward the first position. The plunger 731*b* engaged with the switching slider 734 moves downstream in the X2 direction, that is, the plunger 731*b* moves so as to protrude from the body portion 731*a*.

Operations of Switching Mechanism and Guide Member

Figure 17B:
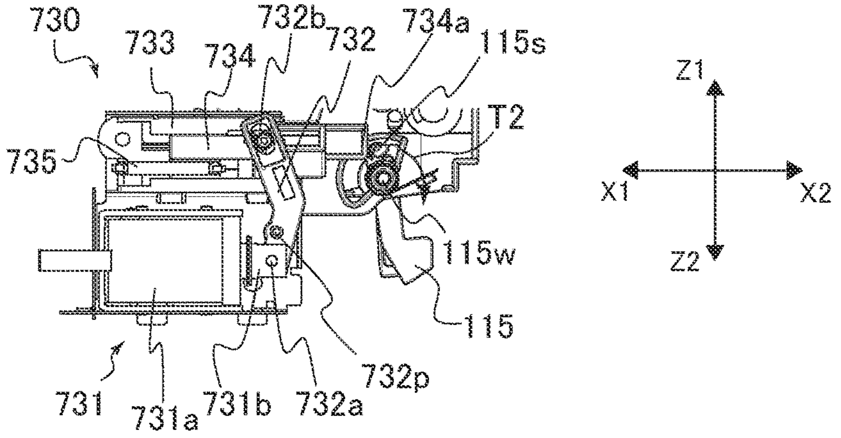
FIG. 17B is a side view illustrating the switching mechanism.
Figure 17C:
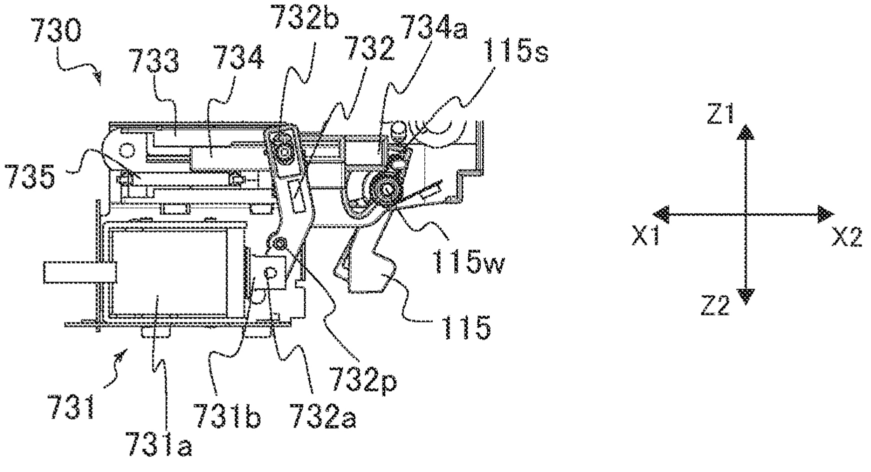
FIG. 17C is a side view illustrating the switching mechanism.

Next, operations of the switching mechanism 730 and the guide member 115 will be described with reference to FIGS. 17A to 18B. FIG. 17B is a side view of the switching mechanism 730 from an upstream perspective in the Y1 direction immediately before the guide member 115 moves from the discharge position to a reversing position and in the middle of movement of the switching slider 734 from the first position to a second position. FIG. 17C is a side view of the switching mechanism 730 from an upstream perspective in the Y1 direction in a state where the guide member 115 is positioned at the reversing position and the switching slider 734 is positioned at the second position.

Figure 18A:
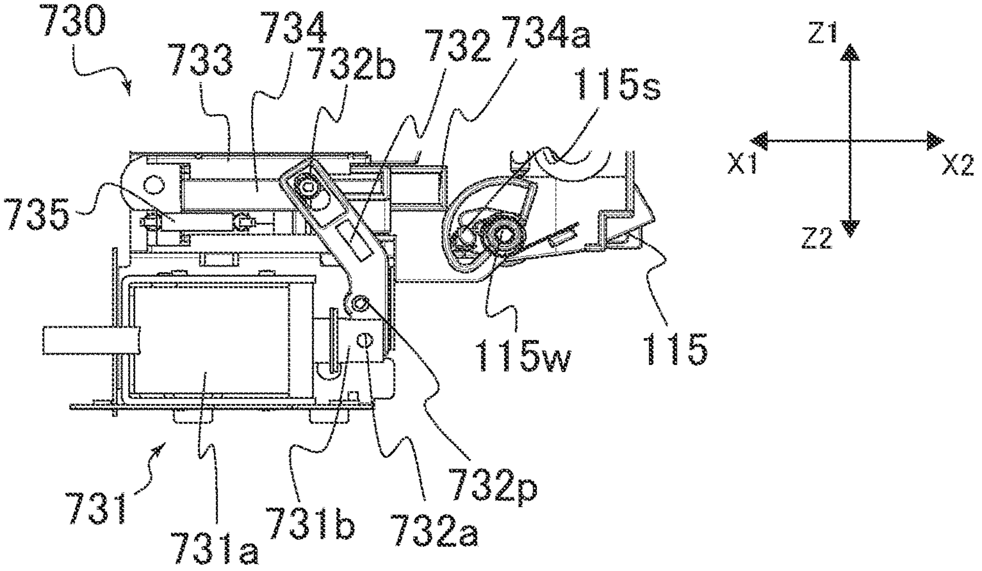
FIG. 18A is a side view illustrating the switching mechanism according to the second embodiment.
Figure 18B:
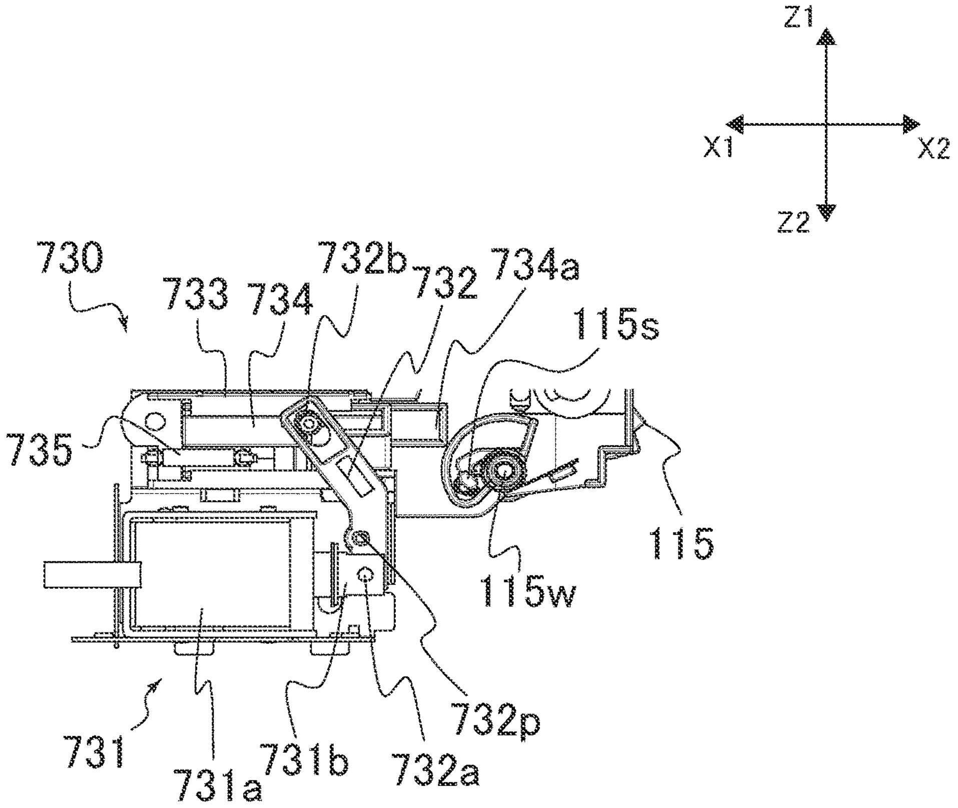
FIG. 18B is a side view illustrating the switching mechanism.

In FIGS. 17A to 17C, a rear door 131 is closed, and in FIGS. 18A and 18B, the rear door 131 is opened. In a case where the rear door 131 is closed and the solenoid 731 is in a non-energized state as illustrated in FIG. 17A, the pressing portion 734*a* of the switching slider 734 is separated from the pressed portion 115*s* of the guide member 115. Therefore, the guide member 115 is positioned at the discharge position by an urging force of a spring 711 (see FIGS. 4A and 4B).

As illustrated in FIG. 17B, in a case where the current flows through the electromagnetic coil of the solenoid 731 and the solenoid 731 is in an energized state, the plunger 731*b* moves downstream in the X1 direction against the urging force of the separation spring 735. As a result, the link 732 engaged with the plunger 731*b* pivots clockwise about the pivot center 732*p*. The switching slider 734 moves downstream in the X2 direction from the first position illustrated in FIG. 17A to the second position illustrated in FIG. 17C in conjunction with the pivoting of the link 732. When the pressing portion 734*a* of the switching slider 734 presses the pressed portion 115*s* of the guide member 115 downstream in the X2 direction, the guide member 115 pivots about a pivot center boss 115*w* in the T2 direction from the discharge position toward the reversing position.

Then, as illustrated in FIG. 17C, when the switching slider 734 is positioned at the second position and the guide member 115 reaches the reversing position, the guide member 115 abuts against a regulating portion (not illustrated) and stops. As long as the energized state of the solenoid 731 is maintained, the guide member 115 is held at the reversing position.

When the solenoid 731 transitions to the non-energized state from the state of FIG. 17C, the switching slider 734 moves downstream in the X1 direction by the urging force of the separation spring 735. That is, the switching slider 734 moves from the second position to the first position. As a result, the guide member 115 is separated from the switching slider 734 and returns to the discharge position by the urging force of the spring 711.

FIG. 18A is a side view of the switching mechanism 730 from an upstream perspective in the Y1 direction in a state where the guide member 115 is positioned at a first jam handling position and the switching slider 734 is positioned at the first position. FIG. 18B is a side view of the switching mechanism 730 from an upstream perspective in the Y1 direction in a state where the guide member 115 is positioned at a second jam handling position and the switching slider 734 is positioned at the first position.

As illustrated in FIG. 18A, when the rear door 131 is opened to an open position, the solenoid 731 is in the non-energized state. Therefore, the switching slider 734 is positioned at the first position as in FIG. 17A. When the rear door 131 is opened, the rear door 131 is separated from the guide member 115 (see FIG. 10B). Therefore, the guide member 115 urged by the spring 711 in the T1 direction pivots toward the first jam handling position illustrated in FIG. 10B.

A configuration for holding the guide member 115 at the first jam handling position is similar to that of the first embodiment, and thus a description thereof will be omitted. Further, as illustrated in FIGS. 18B and 13, the user can pivot the guide member 115 to the second jam handling position by manually lifting the guide member 115 as in the first embodiment. As a result, a work space L between the guide member 115 and the rear door 131 is widened, and maintainability can be improved.

As illustrated in FIGS. 17A to 18B, the pressing portion 734*a* of the switching slider 734 positioned at the first position is disposed at a position not overlapping a movement locus 115*k* (see FIG. 14B) of the pressed portion 115*s* in a case where the guide member 115 moves between the reversing position and the second jam handling position.

Therefore, in a case where the user operates the guide member 115 from the first jam handling position to the second jam handling position, the pressed portion 115*s* does not come into contact with the pressing portion 734*a* of the switching slider 734. Therefore, even in a case where the user operates the guide member 115 from the first jam handling position to the second jam handling position, a load necessary for moving the switching slider 734, the link 732, and the plunger 731*b* is not applied to the user. Therefore, a force for operating the guide member 115 can be reduced, and operability of the guide member 115 can be improved.

Third Embodiment

Next, a third embodiment of the present invention will be described. The third embodiment is different from the first embodiment in that the position regulating spring 716 is omitted. Therefore, a description of the same configuration as that of the first embodiment will be omitted.

In the third embodiment, a guide member 115 is configured to be movable to a discharge position, a reversing position, and a first jam handling position, and does not move to a second jam handling position. That is, when a rear door 131 is opened, the guide member 115 pivots in the T1 direction by an urging force of a spring 711 (see FIG. 10B). Then, the guide member 115 abuts against an abutment member (not illustrated) at the first jam handling position to be positioned at the first jam handling position. For example, a rotation shaft 114*s* (see FIG. 13) of a reverse driving roller 114*r* may be used as the abutment member, and a configuration of the abutment member is not limited.

As a result, the position regulating spring 716 can be omitted, and the cost can be reduced. When the rear door 131 is opened to an open position, the guide member 115 automatically pivots to the first jam handling position. In this state, since a fixing portion 101 can be attached to and detached from an apparatus body 1A, the maintainability and the jam handling performance can be improved. In addition, since the guide member 115 and an intermediate conveyance guide 116 pivot to a discharge position and a guide position, respectively, in conjunction with an operation of closing the rear door 131, the usability can be improved.

Fourth Embodiment

Next, a fourth embodiment of the present invention will be described. The fourth embodiment is different from the first embodiment in that the position regulating spring 716 is omitted and a spring pressure of the spring 711 is changed. Therefore, a description of the same configuration as that of the first embodiment will be omitted.

A spring pressure of a spring 711 according to the fourth embodiment is set such that a position of a guide member 115 when a weight of the guide member 115 and the spring pressure of the spring 711 are balanced is a middle position between a discharge position and a first jam handling position. That is, when a rear door 131 is opened, the guide member 115 is held at the middle position between the discharge position and the first jam handling position.

The middle position includes the first jam handling position. That is, the weight of the guide member 115 and an urging force of the spring 711 may be balanced when the guide member 115 is positioned at the first jam handling position.

The guide member 115 according to the present embodiment is configured to be pivotable from the middle position to a second jam handling position (see FIG. 13) when the user lifts the guide member 115. Accordingly, the maintainability and the jam handling performance can be improved.

When the rear door 131 is closed, the guide member 115 positioned at the middle position is pressed by a cam 131*f* (see FIG. 15A) of the rear door 131. Since the guide member 115 and an intermediate conveyance guide 116 pivot to the discharge position and a guide position, respectively, in conjunction with an operation of closing the rear door 131 as described in the first embodiment, the usability can be improved.

Other Embodiments

The third and fourth embodiments may be combined with the second embodiment. That is, the position regulating spring 716 according to the second embodiment may be omitted. Further, the spring pressure of the spring 711 may be changed as described in the fourth embodiment.

In any of the embodiments described above, the process cartridge 1B and the toner cartridge 1C are attachable to and detachable from the apparatus body 1A, but the present technology is not limited thereto. The number of cartridges attachable to and detachable from the apparatus body 1A can be arbitrarily set, and for example, the process cartridge 1B may be undetachable from the apparatus body 1A.

In any of the embodiments described above, the image forming apparatus is configured to directly transfer a toner image from the photosensitive drum 11 to the sheet S. However, the present technology is not limited thereto. For example, the toner image on the photosensitive drum 11 may be transferred to the sheet S via an intermediate transfer belt. That is, the present technology may be applied not only to an image forming apparatus such as a monochrome printer but also to a full-color image forming apparatus. Further, the present technology can be applied not only to an electrophotographic image forming apparatus but also to, for example, an inkjet image forming apparatus that forms an image on a sheet by ejecting ink from a nozzle.

In any of the embodiments described above, the guide member 115 is regulated by the rear door 131 in the closed state and is configured to move to the first jam handling position in conjunction with the opening of the rear door 131, but the present technology is not limited thereto. For example, a regulating portion corresponding to the pivot regulating portion 131*e* of the rear door 131 may be provided separately from the rear door 131, and the guide member 115 may be moved to the first jam handling position by moving the regulating portion after opening the rear door 131.

In the first embodiment, the switching gear spring 712 is used to move the switching gear 701 to the first position, but the present technology is not limited thereto. For example, the switching gear spring 712 may be omitted, and the switching gear 701 may be urged toward the first position by a moment generated by the weight of the switching gear 701.

In any of the embodiments described above, the guide member 115 is urged toward the first jam handling position by the spring 711, but the present technology is not limited thereto. For example, the guide member 115 may be urged toward the first jam handling position by its own weight. Further, even when the user opens the rear door 131, the guide member 115 may be held at the discharge position or held at a position between the discharge position and the first jam handling position by its own weight. In this case, when the user operates the guide member 115, the guide member 115 can move to the first jam handling position or the second jam handling position.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-075873, filed May 1, 2023, which is hereby incorporated by reference herein in its entirety.

What is claimed is:

1. An image forming apparatus comprising:
- an apparatus body; and
- an opening and closing member configured to move between a closed position at which the opening and closing member is closed with respect to the apparatus body and an open position at which the opening and closing member is opened with respect to the apparatus body,
- wherein the apparatus body includes:
  - an image forming portion configured to form an image on a sheet;
  - a sheet conveyance path including a first conveyance path and a second conveyance path through which the sheet passes;
  - a guide member configured to move to a first guide position at which the guide member guides the sheet toward the first conveyance path, and a second guide position at which the guide member guides the sheet toward the second conveyance path in a state where the opening and closing member is positioned at the closed position;
  - a drive source; and
  - a guide moving member including a pressing portion and configured to be positioned at a first position in a case where the opening and closing member is positioned at the open position, the guide moving member moving the guide member from the first guide position to the second guide position by the pressing portion pressing a pressed portion of the guide member in a case where the guide moving member moves from the first position to a second position by receiving a driving force from the drive source,
- the guide member is configured to move to a first retraction position to open the sheet conveyance path in a state where the opening and closing member is positioned at the open position and the guide moving member is positioned at the first position, and
- the pressing portion of the guide moving member positioned at the first position is disposed at a position not overlapping a movement locus of the pressed portion in a case where the guide member moves between the first guide position, the second guide position, and the first retraction position.

2. The image forming apparatus according to claim 1, wherein the apparatus body includes a first urging member that urges the guide moving member toward the first position.

3. The image forming apparatus according to claim 1, wherein the guide member is configured to move toward the first retraction position in conjunction with a movement of the opening and closing member from the closed position to the open position.

4. The image forming apparatus according to claim 1, wherein the guide member is configured to move toward the first guide position in conjunction with a movement of the opening and closing member from the open position to the closed position.

5. The image forming apparatus according to claim 1, wherein the guide moving member is configured to rotate.

6. The image forming apparatus according to claim 5, wherein the drive source is a motor, and the guide moving member includes a gear portion that receives a driving force from the motor.

7. The image forming apparatus according to claim 6, wherein the apparatus body includes a clutch provided in a drive transmission path between the motor and the guide moving member and configured to transition to a transmission state where the clutch transmits the driving force of the motor to the guide moving member and a non-transmission state where the clutch does not transmit the driving force of the motor to the guide moving member.

8. The image forming apparatus according to claim 7, wherein the guide moving member is positioned at the first position and the guide member is positioned at the first guide position in a state where the clutch is in the non-transmission state and in a state where the opening and closing member is positioned at the closed position, the guide moving member moves from the first position to the second position and the guide member moves from the first guide position to the second guide position in a case where the clutch transitions from the non-transmission state to the transmission state in a state where the opening and closing member is positioned at the closed position, and the guide member moves toward the first retraction position in conjunction with a movement of the opening and closing member from the closed position to the open position.

9. The image forming apparatus according to claim 1, wherein the guide moving member is configured to slide.

10. The image forming apparatus according to claim 9, wherein the drive source is a solenoid including a plunger that interlocks with the guide moving member.

11. The image forming apparatus according to claim 10, wherein in a case where the solenoid is in a non-energized state in a state where the opening and closing member is positioned at the closed position, the guide moving member is positioned at the first position and the guide member is positioned at the first guide position, in a case where the solenoid transitions from the non-energized state to an energized state in a state where the opening and closing member is positioned at the closed position, the guide moving member moves from the first position to the second position and the guide member moves from the first guide position to the second guide position, and the guide member moves toward the first retraction position in conjunction with a movement of the opening and closing member from the closed position to the open position.

12. The image forming apparatus according to claim 1, wherein the apparatus body includes a second urging member that urges the guide member toward the first retraction position, and the guide member is positioned at the first guide position by abutting against the opening and closing member in a case where the opening and closing member is positioned at the closed position, and moves toward the first retraction position by an urging force of the second urging member in a case where the opening and closing member moves from the closed position to the open position.

13. The image forming apparatus according to claim 12, wherein the guide member is configured to move to a second retraction position opposite to both of the first guide position and the second guide position with respect to the first retraction position in a case where the opening and closing member is positioned at the open position, and the pressing portion of the guide moving member positioned at the first position is disposed at a position not overlapping a movement locus of the pressed portion in a case where the guide member moves between the first guide position, the second guide position, the first retraction position, and the second retraction position.

14. The image forming apparatus according to claim 13, wherein the apparatus body includes an elastic member separated from the guide member positioned at the first guide position or the second guide position and configured to abut on the guide member positioned at the first retraction position, in a case where the guide member is positioned at the first retraction position, a force received from the elastic member is larger than a force received from the second urging member, and in a case where the guide member moves from the first retraction position to the second retraction position, the guide member elastically deforms the elastic member.

15. The image forming apparatus according to claim 12, wherein a weight of the guide member and the urging force of the second urging member are balanced in a case where the guide member is positioned at the first retraction position.

16. The image forming apparatus according to claim 12, wherein the apparatus body includes an abutment member configured to abut on the guide member positioned at the first retraction position to position the guide member at the first retraction position.

17. The image forming apparatus according to claim 1, wherein the guide member is configured to be pivot.

18. The image forming apparatus according to claim 1, wherein the apparatus body includes:

a fixing portion configured to fix, to the sheet, the image formed on the sheet by the image forming portion;

a discharge portion configured to discharge the sheet to which the image is fixed by the fixing portion to an outside of the apparatus;

a reverse conveyance portion configured to reverse and convey the sheet conveyed by the fixing portion;

the first conveyance path configured to guide the sheet having passed through the fixing portion to the discharge portion;

the second conveyance path in which the reverse conveyance portion is provided; and a third conveyance path configured to guide the sheet reversed by the reverse conveyance portion toward the image forming portion again.

19. The image forming apparatus according to claim 18, wherein the fixing portion is configured to be attached to and detached from a frame of the apparatus body in a case where the opening and closing member is positioned at the open position and the guide member is positioned at the first retraction position.

20. The image forming apparatus according to claim 1, wherein the image forming portion includes a photosensitive member that bears a toner image, and a transfer portion that transfers the toner image to the sheet, and the drive source drives the photosensitive member.

* * * * *